(12) United States Patent
Li et al.

(10) Patent No.: US 11,995,303 B2
(45) Date of Patent: May 28, 2024

(54) USER INTERFACE FOR REMINDING A USER OF INCOMPLETE TASKS IN INACTIVE APPLICATION WINDOWS

(71) Applicant: Citrix Systems, Inc., Fort Lauderdale, FL (US)

(72) Inventors: Qiming Li, Nanjing (CN); Dai Li, Nanjing (CN); Zhenxing Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 75 days.

(21) Appl. No.: 17/568,258

(22) Filed: Jan. 4, 2022

(65) Prior Publication Data
US 2023/0195294 A1 Jun. 22, 2023

Related U.S. Application Data

(63) Continuation of application No. PCT/CN2021/139970, filed on Dec. 21, 2021.

(51) Int. Cl.
*G06F 3/04817* (2022.01)
*G06F 3/04847* (2022.01)
*G06F 3/04886* (2022.01)
*G06F 9/451* (2018.01)

(52) U.S. Cl.
CPC ...... *G06F 3/04847* (2013.01); *G06F 3/04817* (2013.01); *G06F 3/04886* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 7,233,229 B2* | 6/2007 | Stroupe | ............... | G06Q 10/109 455/412.2 |
| 8,055,523 B2* | 11/2011 | Finke | ............... | G06Q 10/06311 705/7.13 |
| 8,099,464 B2* | 1/2012 | Cooperman | ............ | H04L 51/04 709/204 |

(Continued)

FOREIGN PATENT DOCUMENTS

| | | |
|---|---|---|
| CN | 105955566 A | 9/2016 |
| CN | 107368398 A | 11/2017 |
| CN | 109271601 A | 1/2019 |

OTHER PUBLICATIONS

International Search Report and Written Opinion dated Sep. 21, 2022 for International Patent Application No. PCT/CN2021/139970.

*Primary Examiner* — Henry Orr

(57) ABSTRACT

In accordance with one disclosed method, a determination may be made that a user has provided a first input to a client device to begin taking an action with respect to an application presented in a first window of an operating system while the first window is an active window of the operating system. It may then be determined that a second window has become the active window of the operating system, and that the user has not provided a second input to the client device to complete the action with respect to the application. Based at least in part on the second window having become the active window and the user not having provided the second input, the client device may be caused to present a notification indicative of the action being incomplete.

17 Claims, 15 Drawing Sheets

128

| Entry ID | Application ID | Text Element Type | Completion Element Type | Notification Text | Time Threshold |
|---|---|---|---|---|---|
| 0001 | Internet Explorer | Address Bar | Enter Button | Did you for get to submit your search query? | 15:00 |
| 0002 | Outlook | Email Body | Send Button | Did you want to finish drafting your email? | 10:00 |
| 0003 | Slack | Message Body | Send Button | Did you forget to sent your Slack message? | 5:00 |
| 0004 | Teams | Addressee | Send Button | Did you forget to send your Teams message? | 10:00 |
| | | | | | |
| | | | | | |
| | | | | | |
| | | | | | |

Application Configuration Table

(56) References Cited

U.S. PATENT DOCUMENTS

| | | | | |
|---|---|---|---|---|
| 8,190,213 | B2* | 5/2012 | Sierawski | H04M 1/72469 |
| | | | | 455/567 |
| 8,707,199 | B2* | 4/2014 | Smith | G06F 3/0481 |
| | | | | 715/780 |
| 9,696,886 | B2* | 7/2017 | Krishnappa | G06F 9/4893 |
| 11,457,730 | B1* | 10/2022 | Eidam | H04W 4/026 |
| 2004/0201608 | A1 | 10/2004 | Fai et al. | |
| 2016/0247110 | A1* | 8/2016 | Sinha | G06Q 10/06316 |
| 2017/0169382 | A1* | 6/2017 | Thapliyal | G06Q 10/1093 |
| 2017/0352008 | A1* | 12/2017 | Gao | G06Q 10/1097 |
| 2020/0258022 | A1* | 8/2020 | Sinha | G06Q 10/06 |

* cited by examiner

Application Configuration Table 128

| Entry ID 130 | Application ID 132 | Text Element Type 134 | Completion Element Type 136 | Notification Text 138 | Time Threshold 140 |
|---|---|---|---|---|---|
| 0001 | User App A | TET 1 | CET 1 | NT 1 | TT 1 |
| 0002 | User App B | TET 2 | CET 2 | NT 2 | TT 2 |
| 0003 | User App C | TET 3 | CET 3 | NT 3 | TT 3 |
| 0004 | User App D | TET 4 | CET 4 | NT 4 | TT 4 |
| | | | | | |

Window Status Table 142

| Entry ID 144 | Application ID 146 | Window ID 148 | Text Element ID 150 | Completion Element ID 152 | Inactive Window Timestamp 154 | Inactive Window Flag 156 |
|---|---|---|---|---|---|---|
| 0011 | User App A | Window 1 | TEID 1 | CEID 1 | TS 1 | F 1 |
| 0012 | User App B | Window 2 | TEID 2 | CEID 2 | TS 2 | F 2 |
| 0013 | User App C | Window 3 | TEID 3 | CEID 3 | TS 3 | F 3 |
| 0014 | User App C | Window 4 | TEID 4 | CEID 4 | TS 4 | F 4 |
| | | | | | | |

FIG. 1B

| Entry ID | Application ID | Text Element Type | Completion Element Type | Notification Text | Time Threshold |
|---|---|---|---|---|---|
| 0001 | Internet Explorer | Address Bar | Enter Buton | Did you for get to submit your search query? | 15:00 |
| 0002 | Outlook | Email Body | Send Button | Did you want to finish drafting your email? | 10:00 |
| 0003 | Slack | Message Body | Send Button | Did you forget to sent your Slack message? | 5:00 |
| 0004 | Teams | Addressee | Send Button | Did you forget to send your Teams message? | 10:00 |
|  |  |  |  |  |  |
|  |  |  |  |  |  |
|  |  |  |  |  |  |
|  |  |  |  |  |  |

Application Configuration Table

FIG. 5

| Entry ID | Application ID | Window ID | Text Element ID | Completion Element ID | Inactive Window Timestamp | Inactive Window Flag |
|---|---|---|---|---|---|---|
| 0011 | Internet Explorer | Window 1 | Address Bar 1 | Enter 1 | 2021-12-05 01:23:45 | T |
| 0012 | Slack | Window 2 | Body 1 | Send 1 | 2021-12-05 01:32:54 | T |
| 0013 | Outlook | Window 3 | Body 2 | Send 2 | 2021-12-05 01:35:21 | T |
| 0014 | Teams | Window 4 | Addressee 1 | Send 3 | | F |
| | | | | | | |
| | | | | | | |
| | | | | | | |
| | | | | | | |
| | | | | | | |

Window Status Table

FIG. 6A

| Entry ID | Application ID | Window ID | Text Element ID | Completion Element ID | Inactive Window Timestamp | Inactive Window Flag |
|---|---|---|---|---|---|---|
| 0011 | Internet Explorer | Window 1 | Address Bar 1 | Enter 1 | 2021-12-05 01:32:54 | F |
| 0012 | Slack | Window 2 | Body 1 | Send 1 | 2021-12-05 01:35:21 | T |
| 0013 | Outlook | Window 3 | Body 2 | Submit 1 | | T |

Window Status Table

FIG. 6B

USER INTERFACE FOR REMINDING A USER OF INCOMPLETE TASKS IN INACTIVE APPLICATION WINDOWS

CROSS-REFERENCE TO RELATED APPLICATIONS

This application is a continuation of and claims the benefit under 35 U.S.C. § 120 and 35 U.S.C. § 365(c) to International Application PCT/CN2021/139970, entitled USER INTERFACE FOR REMINDING A USER OF INCOMPLETE TASKS IN INACTIVE APPLICATION WINDOWS, with an international filing date of Dec. 21, 2021, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, FL, including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises determining that a user has provided a first input to a client device to begin taking an action with respect to an application presented in a first window of an operating system while the first window is an active window of the operating system; determining, after the user provided the first input, that a second window has become the active window of the operating system; determining that the user has not provided a second input to the client device to complete the action with respect to the application; and causing, based at least in part on the second window having become the active window and the user not having provided the second input, the client device to present a notification indicative of the action being incomplete.

In some disclosed embodiments, a system comprises at least one processor, and at least one computer-readable medium encoded with instructions which, when executed by the at least one processor, cause the system to determine that a user has provided a first input to a client device to begin taking an action with respect to an application presented in a first window of an operating system while the first window is an active window of the operating system, to determine, after the user provided the first input, that a second window has become the active window of the operating system, to determine that the user has not provided a second input to the client device to complete the action with respect to the application, and to cause, based at least in part on the second window having become the active window and the user not having provided the second input, the client device to present a notification indicative of the action being incomplete.

In some disclosed embodiments, at least one non-transitory computer-readable medium is encoded with instructions which, when executed by at least one processor of a system, cause the system to determine that a user has provided a first input to a client device to begin taking an action with respect to an application presented in a first window of an operating system while the first window is an active window of the operating system, to determine, after the user provided the first input, that a second window has become the active window of the operating system, to determine that the user has not provided a second input to the client device to complete the action with respect to the application, and to cause, based at least in part on the second window having become the active window and the user not having provided the second input, the client device to present a notification indicative of the action being incomplete.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1B shows an example application configuration table and an example window status table that may be accessed by the task reminder engine shown in FIG. 1A;

FIG. 5 shows examples of specific entries that may be written to the example application configuration table shown in FIG. 1B;

FIG. 6A shows examples of specific entries that may be written to the example window status table shown in FIG. 1B at a first time;

FIG. 6B shows examples of specific entries that may be written to the example window status table shown in FIG. 1B at a second time, after the first time;

DETAILED DESCRIPTION

Figure 1A:
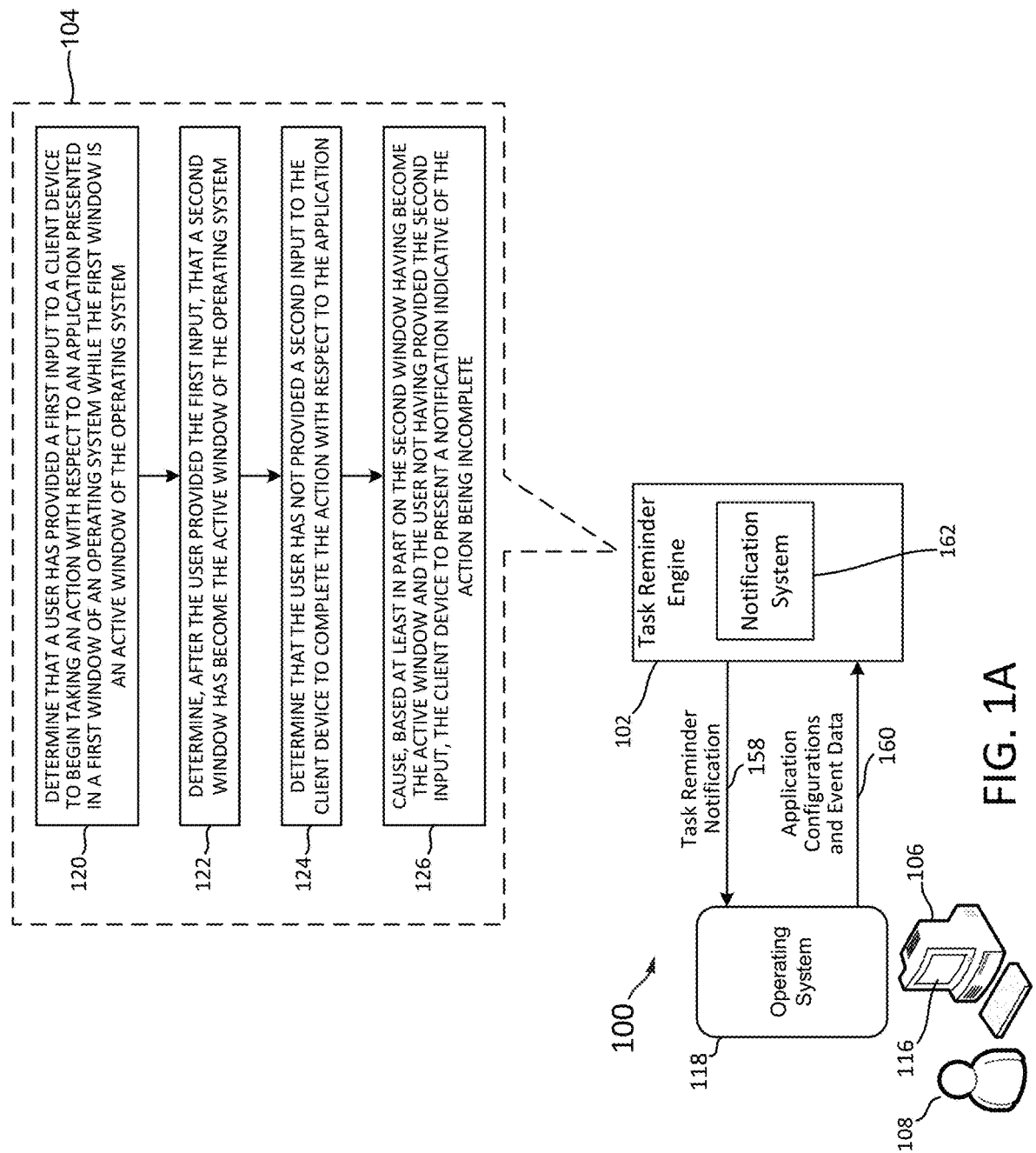
FIG. 1A shows an example system configured to provide a user interface for reminding users of incomplete tasks in inactive application windows in accordance with some aspects of the present disclosure.

For purposes of reading the description of the various embodiments below, the following descriptions of the sections of the specification and their respective contents may be helpful:

Section A provides an introduction to example embodiments of a system for providing a user interface to remind users of incomplete tasks in inactive application windows in accordance with some aspects of the present disclosure;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E provides a more detailed description of example embodiments of the system for providing a user interface to remind users of incomplete tasks in inactive application windows that is introduced in Section A; and Section F describes example implementations of methods, systems/devices, and computer-readable media in accordance with the present disclosure.

A. Introduction to Illustrative Embodiments of a System for Providing a User Interface to Remind Users of Incomplete Tasks in Inactive Application Windows The inventors have recognized and appreciated that it is common for a user to be working on a first task in a first application window and to switch to another application window to perform a second task before the first task is complete. Due to the varying importance of different tasks, a user may be forced to multi-task (i.e., work on multiple tasks quasi-simultaneously) or even halt work on one task in order to focus on another. The interruption by the second task may cause the user to forget to complete the first task, which may result in a number of unintended consequences.

Offered is a system for providing a user interface to remind users of incomplete tasks in inactive application windows. As described in detail below, in some implementations, the system may identify occasions on which a user operating a client device switches context from a first application window on the client device to a second application window on the client device, but neglects to complete a task that the user started to perform within the first application window. For example, a user may have typed text into the body of an email message but did not hit "send" before being interrupted by another task. To complete that other task, the user may have switched context to a different application window, e.g., by opening another email, launching a different application, etc. The user may additionally have been distracted by still other tasks or events, e.g., one or more other emails, one or more phone calls, an unexpected office visit, etc. In the meantime, the user may have forgotten that the original email was not actually sent. Using the techniques described herein, a user interface may advantageously present the user with a notification to remind the user of the incomplete task in the now-inactive application window (e.g., the window of the unsent email). In some implementations, for example, such a reminder notification may be presented if more than a threshold period of time elapses after a user switches context from one active application window to another after having begun, but not completed, a task in the initial window.

Providing such a task reminder may provide significant benefits, as it allows for a user to multi-task and/or attend to other interrupting tasks without forgetting to complete the original task the user was working on by presenting a reminder to a user when the user may be at risk of forgetting to complete the original task.

Figure 1C:
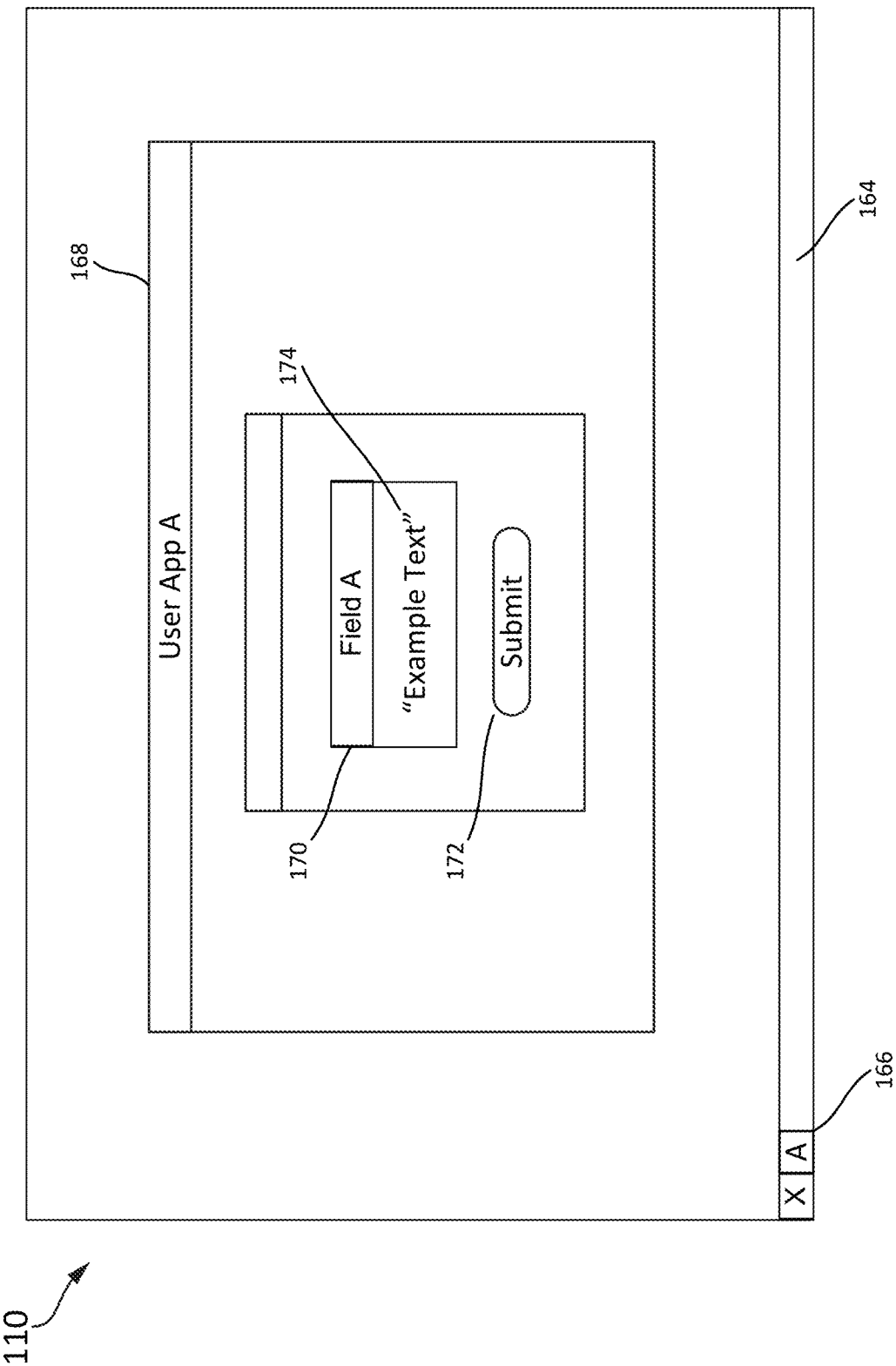
FIG. 1C shows a first example display screen of the client device shown in FIG. 1A.
Figure 1D:
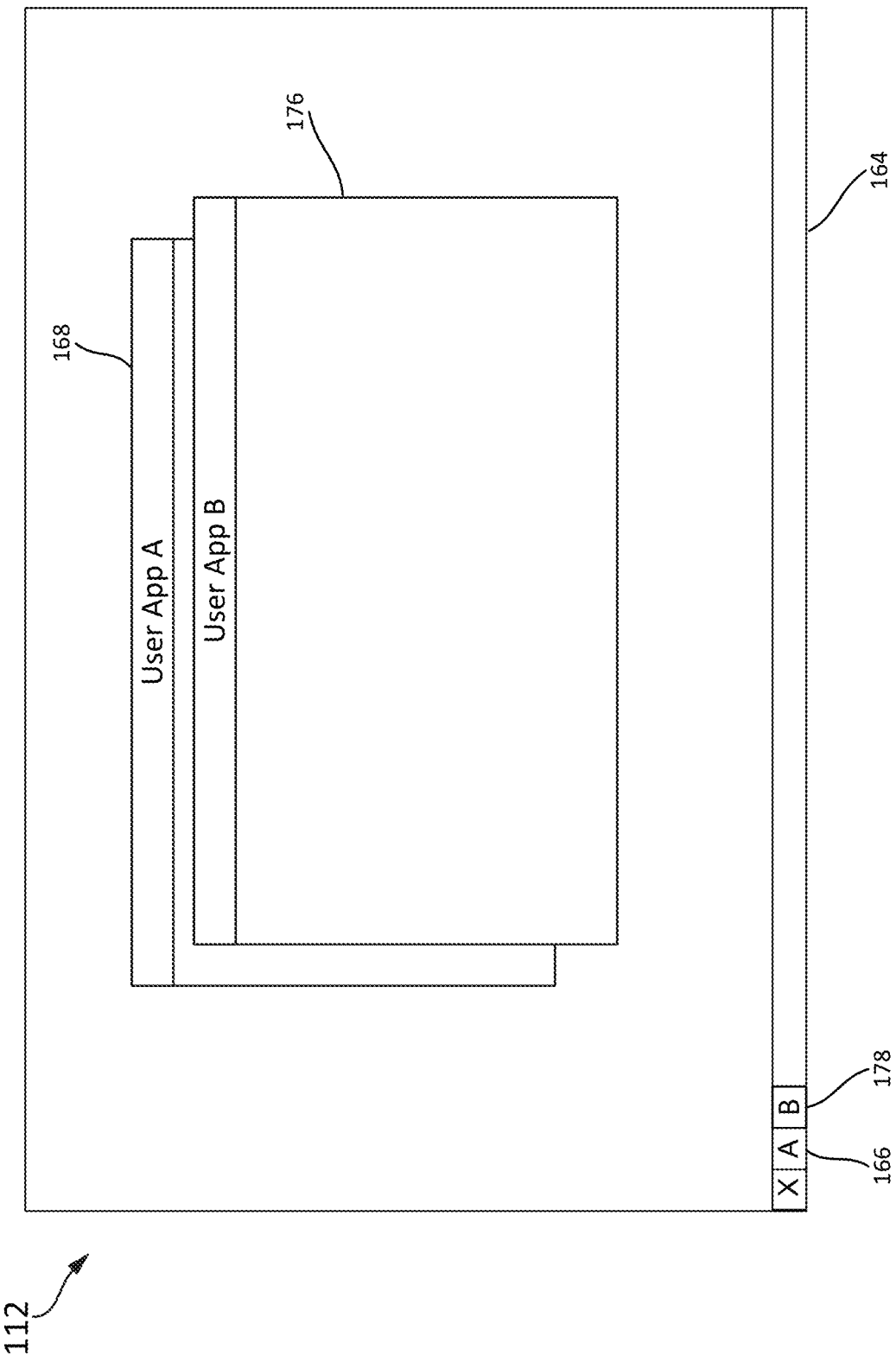
FIG. 1D shows a second example display screen of the client device shown in FIG. 1A.
Figure 1E:
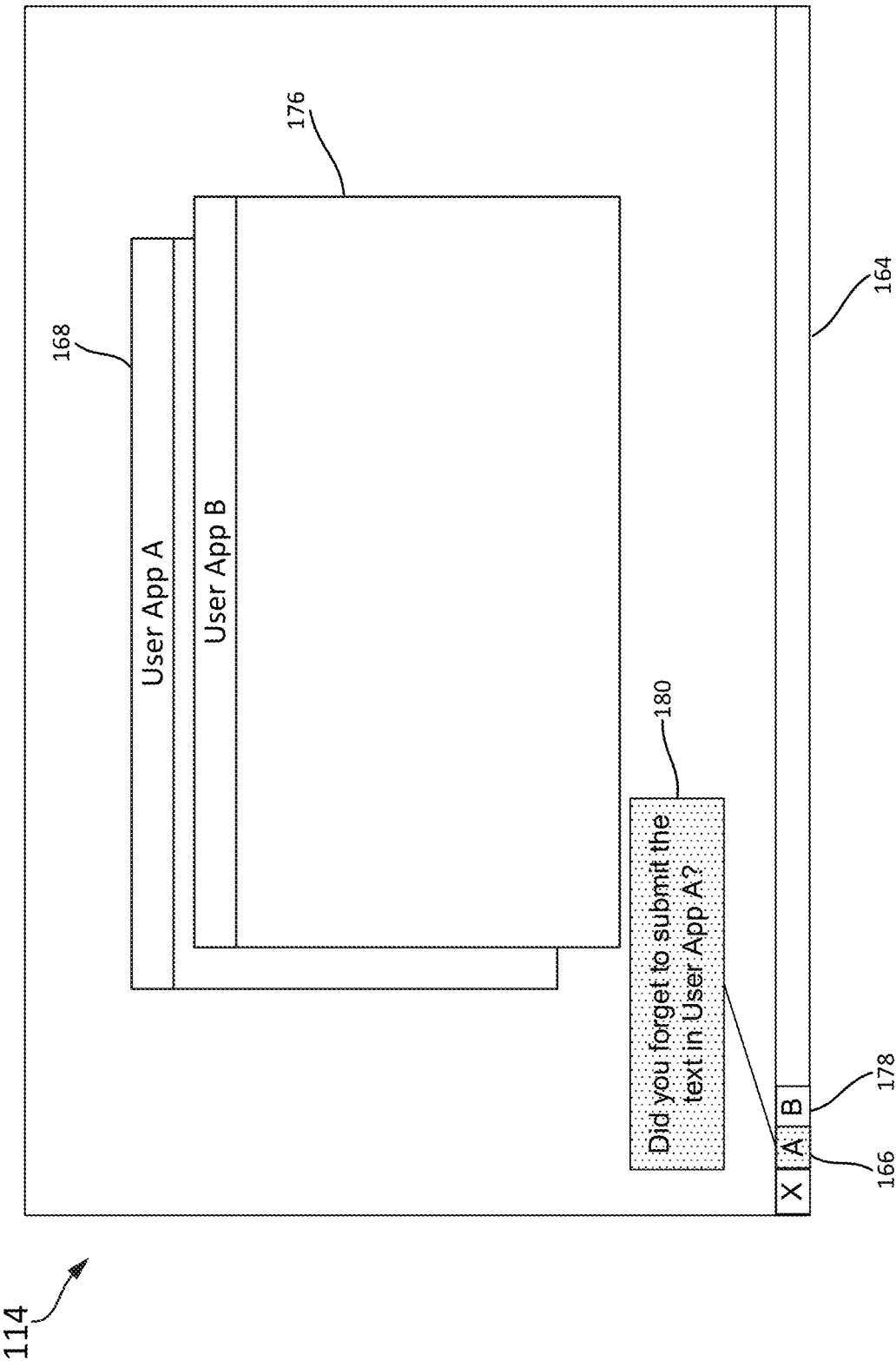
FIG. 1E shows a third example display screen of the client device shown in FIG. 1A.

FIG. 1A shows an example system 100 configured to provide a user interface to remind users of incomplete tasks in inactive application windows. As shown, in some implementations, the system 100 may include a task reminder engine 102 that is configured to perform an example routine 104. In some implementations, the task reminder engine 102 may be implemented on a client device 106 operated by a user 108. The client device 106 may, for example, correspond to one of the clients 202 described below in Sections C and D). In other implementations, the task reminder engine 102 may be implemented remotely from the client device 106, e.g., on one or more servers 204 (examples of which are described in sections C and D below). FIG. 1B, described in more detail below, shows example tables that may be referenced and/or populated by the task reminder engine 102 as the task reminder engine 102 performs the example routine 104. FIGS. 1C-E show example screens 110, 112, and 114, respectively, that may be presented by a display 116 the client device 106 of the system 100 as the task reminder engine 102 performs the example routine 104.

As shown in FIG. 1C, the display 116 of the client device 106 may be presenting (as the screen 110) a particular application ("User App A" in the illustrated example) in the first window 168. As also shown, in addition to the first window 168, the screen 110 may include an application taskbar 164, and an application icon 166. In some implementations, the application presented in the first window 168 may include a text field element 170 and a completion element 172. The text field element 170 may, for example, allow the user 108 to begin taking an action by inputting text 174 into the text field element 170. The completion element 172 may, for example be selectable by the user 108 in order to complete the action. For example, the completion element 172 may be a "send" button, a "submit" button, or the like. FIG. 1D, described in more detail below, shows how a second window 176 may become the active application window (thus making the first window 168 inactive) after the user 108 has begun inputting text 174 into the text field element 170 (shown in FIG. 1C) of the first window 168 but before the user 108 has selected the completion element 172 within the first window 168. FIG. 1E, also described in more detail below, shows how a notification system 162 of the task reminder engine 102 may cause the display 116 of the client device 106 to display a task reminder notification 180 concerning the task that was started but not yet completed when the first window 168 became inactive.

As shown in FIG. 1A, in some implementations, the routine 104 may begin at a step 120, at which the task reminder engine 102 may determine that a user 108 has provided a first input to a client device 106 to begin taking an action with respect to an application presented in a first window 168 (see the screen 110 in FIG. 1C) of an operating system 118 while the first window 168 is an active window of the operating system 118. As used herein, the term "active" window refers to a window that is in the foreground of the display 116 of the client device 106 and/or is currently in focus for the operating system 118, so that inputs provided to an input/output (I/O) component (e.g., a keyboard) of the client device 106 will be inserted within that window. In some implementations, as explained in more detail below, the step 120 may involve accessing and/or updating entries within a window status table 142 (shown in FIG. 1B).

As also shown in FIG. 1A, as indicated by arrow 160, the task reminder engine 102 may use the operating system 118 to determine configurations of applications and event data (e.g., user inputs/actions) associated with the applications. In some implementations, as explained in more detail below, the task reminder engine 102 may determine which configurations of applications and event data to monitor based on an application configuration table 128 (shown in FIG. 1B). Upon receiving the application configurations and event data, the task reminder engine 102 may use them to access and/or update the window status table 142.

In some implementations, the task reminder engine 102 may further include a notification system 162. The task reminder engine 102 may use the notification system 162 to cause the client device 106 to output a task reminder notification 180 (e.g., as shown in FIG. 1E). As indicated by arrow 158 in FIG. 1A, the task reminder engine 102 may send the task reminder notification 180 to the operating system 118 to be presented to the user 108 on the display 116 of the client device 106.

In some implementations, the task reminder engine 102 may determine the user's 108 inputs/actions using event handlers. Such event handlers may be used, for example, to determine if an event associated with a specific user interface (UI) element occurs. The task reminder engine 102 may receive an event notification from an event handler when the event associated with the specific UI element occurs. The event notification may include information sent to the event handler in response to the event associated with the specific UI element occurring. For example, the event notification may include information about the UI element(s) involved in the event, the event that occurred, and changes that resulted from the event. In some implementations, the task reminder engine 102 may determine the configurations of the application by accessing a data structure provided by the operating system 118. Such a data structure may, for example, list individual elements of the user interface. The structure may indicate the appearance of individual elements and their respective functions (e.g., a selectable button, text box, or check box). The task reminder engine 102 may traverse this structure to determine specific UI elements to be monitored (e.g., text box(es), completion button(s), etc) in accordance with the application configuration table 128. Once the task reminder engine 102 determines the specific UI elements to be monitored, the task reminder engine 102 may define an event handler for each UI element that requires monitoring such that relevant events occurring in relation to the UI element(s) may be passed to the respective event handler. For example, the task reminder engine 102 may register for events for a text field UI element to monitor for first user input and register for a related completion UI element to monitor for second user input.

As noted above, in some implementations, the task reminder engine 102 may determine which UI elements to monitor based on the application configuration table 128 (shown in FIG. 1B). The application configuration table 128 may include rows of entries indicating how the task reminder engine 102 should operate with respect to particular applications. For example, as shown in FIG. 1B, in some implementations, the application configuration table 128 may include entries such as "entry ID" entries 130, "application ID" entries 132, a "text element type" entries 134, "completion element type" entries 136, "notification text" entries 138, and "time threshold" entries 140.

In some implementations, the "entry ID" entries 130 may be unique identifiers assigned by the task reminder engine 102 for respective rows of entries in the application configuration table 128.

In some implementations, the "application ID" entries 132 may indicate the names of individual applications.

In some implementations, the "text element type" entries 134 may identify different types of text field elements (e.g., an "address bar" text field element or an "email body" text field element, as discussed further below in Section E).

In some implementations, the "completion element type" entries 136 may identify different types of completion elements (e.g., a "send button" completion element or an "enter button" completion element, as also discussed further below in Section E).

In some implementations, the "notification text" entries 138 may indicate text that is to be presented to the user 108 as part of the task reminder notifications 180 for particular types of tasks. In some implementations, the "notification text" entries 138 may include text tailored to particular applications and may be determined (e.g., by an application developer or system administrator) when the corresponding row of entries for the application configuration table 128 was determined. In some implementations, the "notification text" entries 138 may additionally or alternatively be customized using one or more of the "application ID" entries 132, the "text element type" entries 134, and the "completion element type" entries 136.

In some implementations, the "time threshold" entries 140 may correspond to amounts of time that the task reminder engine 102 is to wait before causing the client device 106 to output particular types of task reminder notifications 180 to the user 108. Therefore, for a given row of entries in the application configuration table 128, the task reminder engine 102 may determine that, for a given application indicated by an "application ID" entry 132, it is to monitor (A) a text field element indicated by the corresponding "text element type" entry 134 and (B) a completion element indicated by the corresponding "completion element type" entry 136. Further, for a given row of entries in the application configuration table 128, the task reminder engine 102 may also determine that the task reminder engine 102 is to cause the client device 106 to output a task reminder notification 180 after the time that has elapsed since the user 108 swapped to the second window without completing the action in the first window 168 exceeds the threshold indicated by the corresponding "time threshold" entry 140, and that such a task reminder notification 180 is to include text indicated by the "notification text" entry 138.

In some implementations, the task reminder engine 102 may determine that the user 108 has accessed the first application in the first window 168 (e.g., as shown in FIG. 1C). In response to determining that the user 108 has accessed the first application, the task reminder engine 102 may access the application configuration table 128 to determine if the first application is listed among the "application ID" entries 132 of the application configuration table 128. If the first application is listed in the application configuration table 128, the task reminder engine 102 may use the application configuration table 128 to determine a corresponding text field element (as indicated by a "text element type" entry 134) and a corresponding completion element (as indicated by a "completion element type" entry 136) that the task reminder engine 102 is to monitor for that application. In some implementations, the task reminder engine 102 may use that information to determine event handlers for monitoring events of the operating system 118.

As noted above, in some implementations, the step 120 of the routine 104 may involve accessing and/or updating the window status table 142 (as shown in FIG. 1B). Such accessing and/or updating of the window status table 142 may, for example, include writing and/or updating "entry ID" entries 144, "application ID" entries 146, "window ID" entries 148, "text element ID" entries 150, "completion element ID" entries 152, "inactive window timestamp" entries 154, and "inactive window flag" entries 156. In some implementations, for example, the task reminder engine 102 may, in response to determining that the user 108 has provided a first user input (e.g., input text 174 into the text field element 170, as shown in FIG. 1C, which may correspond to a "text element type" entry 134 in application configuration table 128), update the window status table 142 by adding a new row of entries to it.

In some implementations, the "entry ID" entries 144 may be unique identifiers assigned by the task reminder engine 102 for respective rows of entries in the window status table 142.

In some implementations, the "application ID" entries 146 may identify the applications into which the user 108 provided the first user input.

In some implementations, the "window ID" entries 148 may identify the particular windows into which the user 108 provided the first user input.

In some implementations, the "text element ID" entries 150 may be unique identifiers assigned by the operating system 118 to the monitored text field elements (e.g., the text field element 170 shown in FIG. 1C) corresponding to the "text element type" entries 134 listed in the application configuration table 128 and where the user 108 entered the first user input.

In some implementations, the "completion element ID" entries 152 may be unique identifiers assigned by the operating system 118 to the monitored completion elements (e.g., the completion element 172 shown in FIG. 1C) corresponding to the "completion element type" entries 136 listed in the application configuration table 128 and that are capable of receiving second user input from the user 108 to complete the action begun by the user 108 providing the first input to the corresponding text field element (e.g., the text field element 170 shown in FIG. 1C).

In some implementations, the "inactive window timestamp" entries 154 may be timestamps generated by the task reminder engine 102 when the task reminder engine 102 determines that respective windows identified by the "window ID" entries 148 in the window status table 142 (e.g., the first window 168) becomes inactive, such as when another window (e.g., the second window 176) becomes active.

In some implementations, the "inactive window flag" entries 156 may indicate whether the application windows identified by the "window ID" entries 148 in respective rows in the window status table 142 are currently inactive. In some implementations, the "inactive window flag" entries 156 may be set to "false" when the corresponding window is in focus by the operating system 118, and may be set to "true" when the corresponding window is out of focus by the operating system 118.

In some implementations, a given row of entries in the window status table 142 may persist until the user 108 closes the window indicated by the corresponding "window ID" entry 148 and/or the user 108 completes the action begun by inputting text to the text field element indicated by the corresponding "text element ID" entry 150 using the completion element indicated by the corresponding "completion element ID" entry 152.

In some implementations, the task reminder engine 102 may receive an event notification that the user 108 has provided the first user input (e.g., inputting the text 174 into the text field element 170 shown in FIG. 1C). In response to the task reminder engine 102 determining that the user 108 has provided the first user input, the task reminder engine 102 may update the window status table 142, e.g., by writing a new row of data to it. In some implementations, the "text element ID" entry 150 and the "completion element ID" entry 152 for the newly-added row may be determined using the information included in the event notification. In other implementations, the "text element ID" entry 150 and the "completion element ID" entry 152 may additionally or alternatively be determined using the data structure provided by the operating system 118.

At a step 122 of the routine 104, the task reminder engine 102 may determine, after the user 108 has provided the first input to the first application (e.g., entering the text 174 in the text field 170), that a second window 176 (see screen 112 in FIG. 1D) has become the active window of the operating system 118. The task reminder engine 102 may make such a determination, for example, by determining that the operating system 118 has given focus to the second window 176. For example, as shown in FIG. 1D, the user 108 may have operated the client device 106 to switch context from the application presented in the first window 168 (e.g., "User App A") to a different application presented in the second window 176 (e.g., "User App B"). In such an example, the application taskbar 164 may also include a second application icon 178 for the different application. As such, the first window 168 may have been switched out of the foreground of the display 116 and may no longer have focus from the operating system 118, and the second window 176 may have been switched to the foreground of the display 116 and been given focus by the operating system 118. Although the illustrated example shows two different applications (i.e., "User App A" and "User App B") presented in the first window 168 and the second window 176, respectively, it should be appreciated that the functionality described herein may likewise be applied to multiple windows for the same application, e.g., multiple different email message windows.

In response to determining that the first window 168 has become out of focus and the second window 176 has become in focus, the task reminder engine 102 may determine a timestamp indicating the time the operating system 118 gave focus to the second window 176. The task reminder engine 102 may write that timestamp (as an application "inactive window timestamp" entry 154) to an appropriate row of the window status table 142, and may also set the corresponding "inactive window flag" entry 156 in that same row to "true." As described in more detail below, the task reminder engine 102 may compare (periodically or otherwise) the "inactive window timestamp" entries 154 in the window status table 142 to the current time (e.g., as determined by a clock of the client device 106) to determine whether an amount of time that has elapsed since the time indicated by the "inactive window timestamp" entry 154 is greater than the amount of time indicated by the "time threshold" entry 140 (in the application configuration table 128) for the type of action at issue. In response to such a threshold being exceeded, the task reminder engine 102 may determine to present a task reminder notification 180 on the display 116. In some implementations, the "inactive window flag" entries 156 may be used to track whether the window (as indicated by a "window ID" entry 148) to which the row relates is currently in an "inactive" state, and the task reminder engine 102 may perform such an evaluation of "inactive window timestamp" entries 154 only for those rows for which the "inactive window flag" entry 156 is "true." As explained in more detail below, an "inactive window flag" entry 156 may be set to "false" when the window in question switches from an "inactive" state to an "active" state, thus preventing the task reminder engine 102 from generating task reminder notifications 180 for tasks in circumstances when the windows for such tasks are currently "active."

In some implementations, to determine whether the second window 176 (see screen 112 in FIG. 1D) has become the active window of the operating system 118, the task reminder engine 102 may determine whether the user 108 has swapped focus from the first application in the first window 168 to the second window 176. Such a swapping of focus may be detected, for example, by registering for an event change for the current focus of the UI, such that when the user 108 changes the current focus on the display 116, a focus event handler of the task reminder engine 102 may be notified.

In some implementations, such focus event handler(s) may be utilized to detect focus changes between windows. The task reminder engine 102 may determine that the focus event handler(s) received an event notification that a focus change has occurred. The task reminder engine 102 may, using the event notification, generate a timestamp corresponding to the time that the event notification was received and may determine information corresponding to the windows involved in the focus change. The task reminder engine 102 may access the window status table 142 and determine if there is an entry in the window status table 142 corresponding to the window indicated in the event notification. If there is not a corresponding entry in the window status table 142, then the task reminder engine 102 may determine that the focus change involves applications and/or windows that do not currently include an incomplete action (e.g., text entered but not submitted). If there is a corresponding entry in the window status table 142, then the timestamp in the "inactive window timestamp" entry 154 and the "inactive window flag" entry 156 may be updated accordingly.

In some implementations, the task reminder engine 102 may use Windows UI Automation to detect focus changes between windows. Window UI Automation is described, for example, at the path "/en-us/dotnet/framework/ui-automation/ui-automation-events-overview" of the uniform resource locator (URL) "docs.microsoft.com." In some implementations, the task reminder engine 102 may register for notification upon a focus change when the user changes focus from the first window 168 to the second window 176 using an AutomationFocusChangedEventHandler. Such a handler is described, for example, at the path "/en-us/dotnet/api/system.windows.automation.automationfocuschanged eventhandler?view=windows desktop-6.0" of the URL "docs.microsoft.com."

The task reminder engine 102 may add a focus event handler using an AddAutomationFocusChangedEventHandler. In response to the user 108 swapping focus from the first window 168 to the second window 176, the focus event handler may be notified. In some implementations, the focus event handler may then determine whether the focus change involved a swap from the first window 168 to the second window 176. For example, the focus event handler may reference the Sender argument, which includes the objects that were involved in the focus change, passed to the focus event handler in response to the focus change to determine that the user 108 has now swapped focus to the second window 176.

As explained in more detail below, in some implementations, a row may deleted from the window status table 142 upon determining that the user 108 has selected the completion element 172 indicated in that row. Further, in some implementations, determining the user 108 has closed the first window 168 (indicated by a "window ID" entry 148) may likewise result in the corresponding row of entries in the window status table 142 being deleted.

In some implementations, a user 108 may swap focus from the first application in the first window 168 to the second window 176 after providing the first user input to begin taking the action in the first window 168, but without providing the second user input to complete the action. The task reminder engine 102 may determine that the user 108 has swapped focus from the first application in the first window 168 to the second window 176 using the focus event handler. The task reminder engine 102 may determine a timestamp corresponding to the time the event notification was received. The task reminder engine 102 may then access the window status table 142 to determine if there are any entries corresponding to the first window 168. If there is a corresponding entry in the window status table 142, the focus event handler may update the "inactive window timestamp" 154 for that row of entries using the timestamp and set the "inactive window flag" entry 156 to "true."

In some implementations, after swapping focus from the first application in the first window 168 to the second window 176, as described above, the user may swap focus from the second window 176 back to the first application in the first window 168. The task reminder engine 102 may determine that the focus event handler received an event notification indicating that the user 108 has swapped focus from the second window 176 to the first application in the first window 168. The task reminder engine 102 may determine information from the event notification corresponding to the windows involved in the focus change. The task reminder engine 102 may then access the window status table 142. Using the information determined from the event notification, the task reminder engine 102 may determine that the information corresponds to an entry in the window status table 142. The task reminder engine 102 may then change the "inactive window flag" entry 156 to "false" and may also optionally delete the corresponding timestamp in the "inactive window timestamp" entry 154.

In some implementations, the task reminder engine 102 may determine that the user 108 has provided the second user input to a completion element corresponding to a "completion element ID" entry 152 in the window status table 142. In some implementations, in response to such a determination, the task reminder engine 102 may delete the row of entries corresponding to that "completion element ID" entry 152 from the window status table 142. In some implementations, the task reminder engine 102 may continue to monitor the windows corresponding to the "window ID" entries 148 in the window status table 142 until the user 108 either provides the second inputs to the indicated completion elements or until the user 108 closes those windows.

At a step 124 of the routine 104 (shown in FIG. 1A), the task reminder engine 102 may determine that the user 108 has not provided a second input to the client device 106 to complete the action with respect to the application presented in the first window 168. As noted above, in some implementations, a row may be deleted from the window status table 142 upon determining that the user 108 has selected the completion element 172 specified in that row (e.g., as indicated by a "completion element ID" entry 152). Accordingly, in such implementations, the task reminder engine 102 may determine if the action has been completed simply by determining whether there is a row of entries in the window status table 142 corresponding to the completion element in question.

At a step 126 of the routine 104, the task reminder engine 102 may cause, based at least in part on the second window 176 having become the active window of the operating system 118 and the user 108 not having provided the second input, the client device 106 to present a task reminder notification 180 (see the screen 114 in FIG. 1E) indicative of the action being incomplete. As shown in FIG. 1E, the user 108 may have operated the client device 106 to switch context from the application presented in the first window 168 (e.g., "User App A") to the application presented in the second window 176 (e.g., "User App B") without having provided the second input, e.g., by selecting the completion element 172 on the screen 114, prior to switching to the new window. In response to the task reminder engine 102 determining that the user 108 has switched context without having provided the second input, the task reminder engine 102 may cause the operating system 118 to present the task reminder notification 180 on the display 116, as shown in FIG. 1E. As illustrated, in some implementations, the task reminder notification 180 may be presented in such a way as to identify the application for which the user 108 did not provide the second input. For example, the task reminder notification 180 may be presented as originating from the application icon 166 on the application taskbar 164 of the display 116, as shown in FIG. 1E.

In some implementations, the task reminder engine 102 may utilize a timing component. The time kept by the timing component may denote the amount of time that has elapsed since the timestamp, corresponding to the time the operating system 118 gave the second window 176 focus, was generated by the task reminder engine 102. Once the task reminder engine 102 determines the timestamp, the task reminder engine 102 may use the time indicated by the corresponding "time threshold" entry 140 in the application configuration table 128 to determine whether the amount of time that has elapsed since the timestamp was generated exceeds the indicated time threshold. In some implementations, the task reminder engine 102 may determine the amount of time that has elapsed by determining the difference between the current time of the operating system 118 and the timestamp. Once the time exceeds the threshold amount of time indicated by the "time threshold" entry 140, the task reminder engine 102 may cause the task reminder notification 180 to appear on the display 116 of the client device 106. In some implementations, causing the task reminder notification 180 to appear on the display 116 may include the task reminder engine 102 accessing the application configuration table 128 to determine the text indicated by the corresponding "notification text" entry 138. The task reminder engine 102 may then use that text to generate the task reminder notification 180 for the incomplete task.

In some implementations, after causing the task reminder notification 180 to be presented to the user, the corresponding row of entries in the window status table 142 may be deleted. In some implementations, the corresponding row of entries in the window status table 142 may not be deleted and, instead, the "inactive window timestamp" entry 154 for the corresponding row of entries in the window status table 142 may be updated to the time that the task reminder notification 180 was presented to the user 108. In some implementations, the task reminder notification 180 may be displayed on the display 116 by the operating system 118. In some implementations, the task reminder notification 180 may be displayed as at least one UI element. For example, the task reminder notification 180 may be displayed as a pop-up window notification originating from an application icon 166, 178 on the application taskbar 164 of the display 116 corresponding to the first application in which that the user 108 did not complete the action. The task reminder notification 180 may also include additional text indicating to the user 108 that the user 108 did not complete the action in the first application. For example, the task reminder notification 180 may include text indicated by the "notification text" entry 138 of the row of entries corresponding to the first application in the application configuration table 128. The task reminder notification 180 may be displayed using various colors and designs that are likely to attract the user's attention. In some implementations, the task reminder notification 180 presented to the user 108 on the display 116 may persist until it is determined that the user 108 has swapped back to the first window 168. In other implementations, the task reminder notification 180 may persist for a specific amount of time before disappearing.

In some implementations, after determining the user 108 has provided the first user input to the first application in the first window 168 to begin taking the action and has swapped focus to a different window without providing second user input to complete the action, the task reminder engine 102 may determine that the user 108 has swapped focus from the different window back to the first application in the first window 168. In response to such a determination, as stated above, the task reminder engine 102 may update the corresponding row of entries in the window status table 142. In some implementations, this may include deleting the timestamp in the "inactive window timestamp" entry 154 and setting the "inactive window flag" entry 156 to "false." After making such updates, the task reminder engine 102 may determine that the user 108 has again swapped focus from the first application in the first window 168 to a different window without providing second user input to complete the action in the first application in the first window 168. In response, the task reminder engine 102 may again update the row of the window status table 142 associated with the first window 168. This may include entering the new timestamp generated when the user 108 swapped focus to the different window in the "inactive window timestamp" entry 154 and setting the "inactive window flag" 156 entry to "true."

Additional details and example implementations of embodiments of the present disclosure are set forth below in Section E, following a description of example systems and network environments in which such embodiments may be deployed.

B. Network Environment

Figure 2:
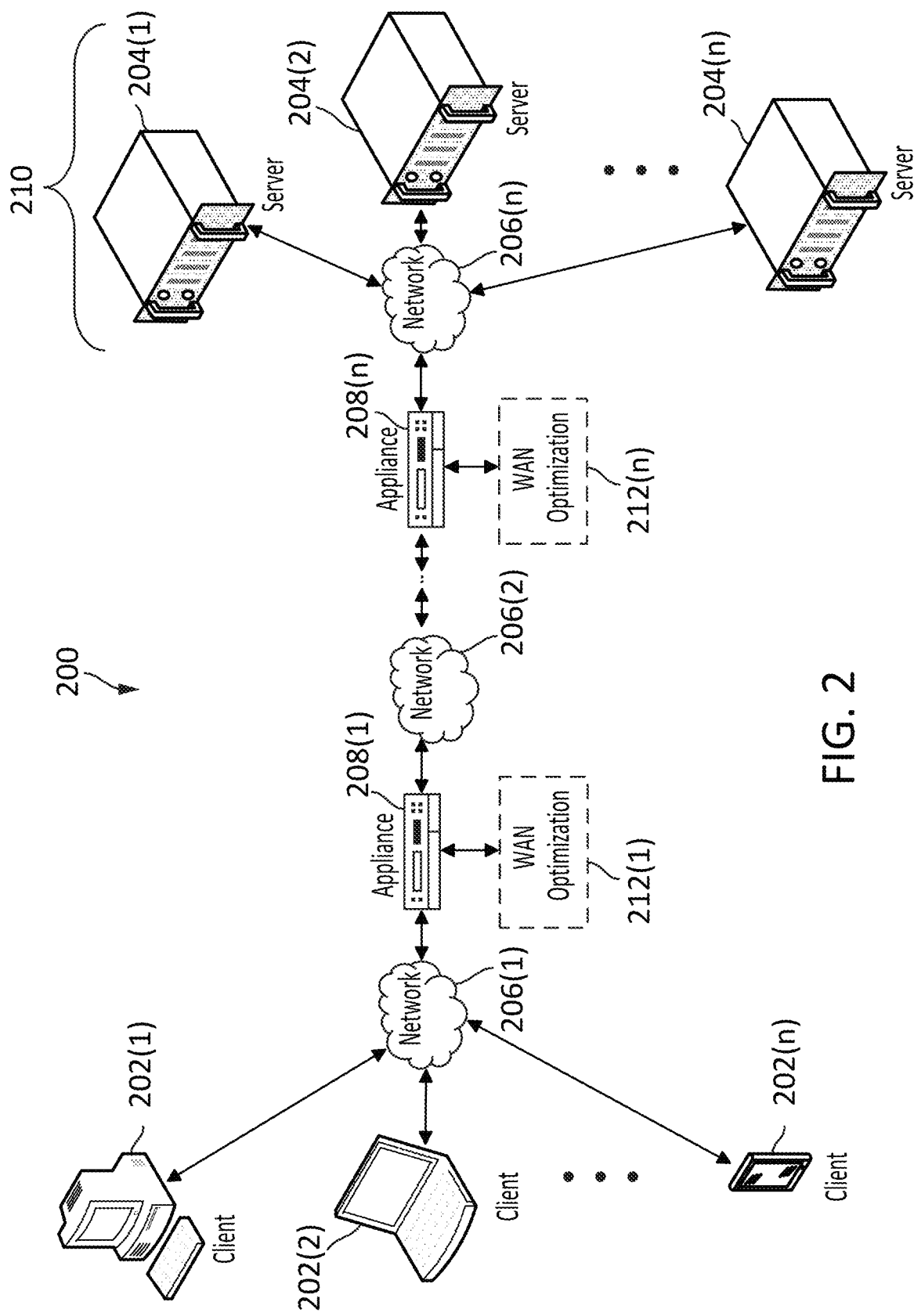
FIG. 2 is a diagram of a network environment in which some embodiments of the system disclosed herein may be deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
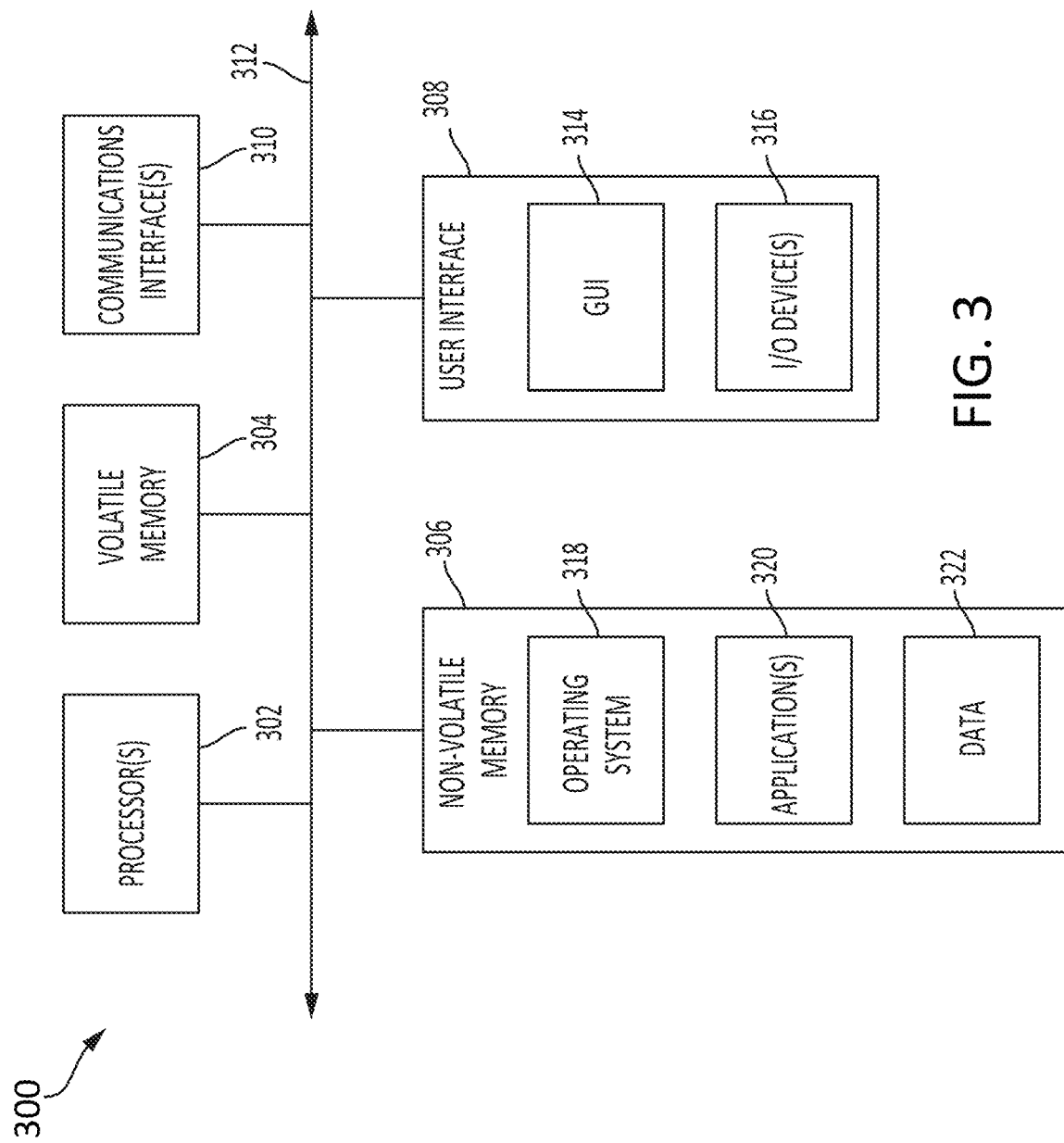
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication with the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
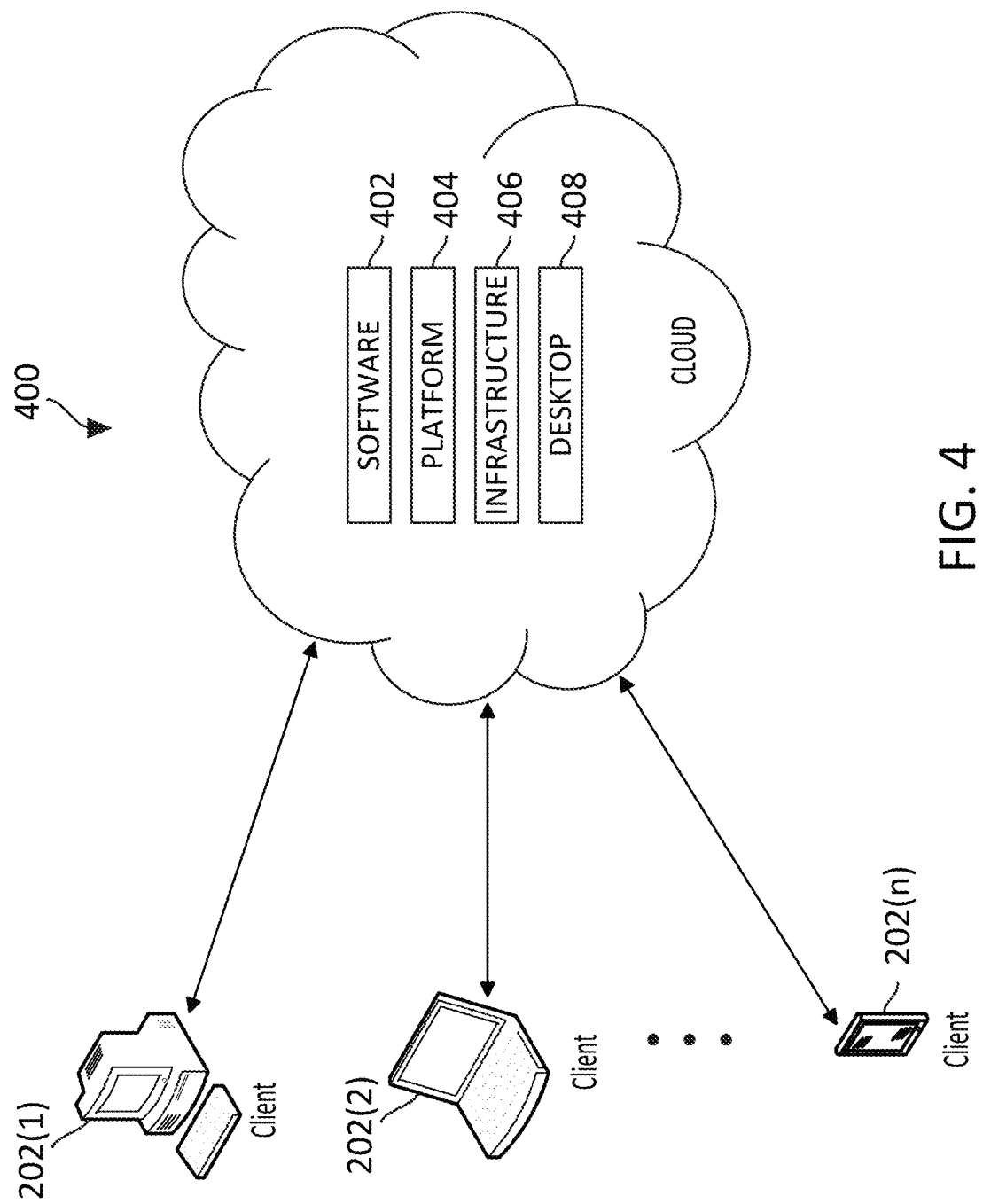
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Washington, Azure IaaS provided by Microsoft Corporation or Redmond, Washington, RACKSPACE CLOUD provided by Rackspace US, Inc., of San Antonio, Texas, Google Compute Engine provided by Google Inc., of Mountain View, California, and RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc., of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc., of San Francisco, California, or OFFICE 365 provided by Microsoft Corporation. Examples of SaaS may also include data storage providers, e.g. Citrix ShareFile® from Citrix Systems, DROPBOX provided by Dropbox, Inc., of San Francisco, California, Microsoft SKYDRIVE provided by Microsoft Corporation, Google Drive provided by Google Inc., or Apple ICLOUD provided by Apple Inc., of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

E. Detailed Description of Example Embodiments of the System for Providing a User Interface to Remind Users of Incomplete Tasks in Inactive Application Windows Section A introduced various systems and techniques for enabling efficient multi-tasking of a user by providing customized task reminders for when a user forgets to complete a task in a first window after being interrupted by a second task in a second window. For instance, as Section A explains in connection with FIGS. 1A-E, in some implementations, the task reminder engine 102 may be used to determine that the user 108 has provided a first input to begin taking an action in an application in the first window 168 (shown in FIG. 1C), determine that the user 108 has swapped focus to a second window 176 (shown in FIG. 1D), determine that the user 108 has not provided a second input to complete the action in the first window 168, and cause the client device 106 to present a task reminder notification 180 (shown in FIG. 1E) to the user 108 indicating that the user 108 has not completed the action in the first window 168.

FIG. 5 shows examples of specific entries that may be written to the application configuration table 128 shown in FIG. 1B, which was also introduced in Section A. As discussed in connection with FIG. 1B, the task reminder engine 102 may determine the UI elements of windows that are to be monitored based on the application configuration table 128, which may include rows of entries indicating how the task reminder engine 102 is to operate with respect to specific applications. For example, as seen in FIG. 5, for the first row of entries, i.e., the row for which the value of the "entry id" entry 130 is "0001," the task reminder engine 102 may use the application configuration table 128 to determine that, for the application indicated by the "application ID" entry 132 (i.e., "Internet Explorer"), the task reminder engine 102 is to monitor a text field element of the type indicated by the "text element type" entry 134 (i.e., an "address bar") to determine if the user 108 has entered text via that text field element. The task reminder engine 102 may also use the first row of entries shown in FIG. 5 to determine that the task reminder engine 102 is to monitor a completion element of the type indicated by the "completion element type" entry 136 (i.e., an "enter button") for input from the user 108 which would complete the action begun by the user 108 by entering the text into the corresponding text field element (i.e., the "address bar"). The task reminder engine 102 may also use the first row of entries shown in FIG. 5 to determine that, after the user 108 has swapped focus from a window of the application indicated by the "application ID" entry 132 (i.e., "Internet Explorer") to another window (e.g., from a first window 168 for the indicated application to a second window 176, as shown in FIG. 1D) without selecting the corresponding completion element (i.e., the "enter button") for an amount of time that exceeds the threshold time indicated by the "time threshold" entry 140 (i.e., "15:00 minutes"), the task reminder engine 102 is to present a task reminder notification 180 to the user 108 including the text indicated by the "notification text" entry 138 (i.e., "did you forget to submit your search query").

As another example, as seen in FIG. 5, for the second row of entries, i.e., the row for which the value of the "entry id" entry 130 is "0002," the task reminder engine 102 may use the application configuration table 128 to determine that, for the application indicated by the "application ID" entry 132 (i.e., "Outlook"), the task reminder engine 102 is to monitor a text field element of the type indicated by the "text element type" entry 134 (i.e., an "email body") to determine if the user 108 has entered text via that text field element. The task reminder engine 102 may also use the second row of entries shown in FIG. 5 to determine that the task reminder engine 102 is to monitor a completion element of the type indicated by the "completion element type" entry 136 (i.e., an "send button") for input from the user 108 which would complete the action begun by the user 108 by entering the text into the corresponding text field element (i.e., the "email body").

The task reminder engine 102 may also use the second row of entries shown in FIG. 5 to determine that, after the user 108 has swapped focus from a window of the application indicated by the "application ID" entry 132 (i.e., "Outlook") to another window (e.g., from a first window 168 for the indicated application to a second window 176, as shown in FIG. 1D) without selecting the corresponding completion element (i.e., the "send button") for an amount of time that exceeds the threshold time indicate by the "time threshold" entry 140 (i.e., "10:00 minutes"), the task reminder engine 102 is to present a task reminder notification 180 to the user 108 including the text indicated by the "notification text" entry 138 (i.e., "do you want to finish drafting your email"). Although not shown in FIG. 5, it should be appreciated that one or more of the "notification text" entries 138 may additionally or alternatively draw on the contents of other monitored UI elements to determine the text that is to be presented as a task reminder notification 180. For instance, in some implementations, the application configuration table 128 may include an additional column indicating types of UI elements that are indicative of addressees of messages (e.g., the "To:" field of emails or other messages), and the "notification text" entries 138 may indicate that identifiers of such addressees are to be included in task reminder notifications (e.g., "Did you for get to send an email to UserA@mailaddress.com?").

FIGS. 6A and 6B show examples of specific entries that may be written to the window status table 142 shown in FIG. 1B, which was introduced in Section A. As shown in FIG. 6A, at a first time, the client device 106 may have four application windows open and being monitored by the task reminder engine 102 (i.e., "Window 1," "Window 2," "Window 3," and "Window 4"). In particular, the client device 106 may have "Window 1" open for an "Internet Explorer" application, may have "Window 2" open for a "Slack" application, may have "Window 3" open for an "Outlook" application, and may have "Window 4" open for a "Teams" application. The task reminder engine 102 may have determined that "Window 1", "Window 2" and "Window 3" are currently inactive (i.e., the user 108 has provided a first user input to begin an action, but has not completed the action and has swapped focus to a different window). As shown, for the respective "inactive" windows, the "inactive window flag" entry 156 has been set to "true," and the "inactive window timestamp" entry 154 includes a timestamp indicative of the time that focus switched away from that window. The task reminder engine 102 may have determined that "Window 4" is not inactive. Accordingly, for "Window 4," the "inactive window flag" entry 156 has been set to "false," and the "inactive window timestamp" entry 154 does not include a timestamp.

FIG. 6B shows examples of specific entries in the window status table 142 at a second time, after the first time. As shown in FIG. 6B, the client device 106 now has three windows open and being monitored by the task reminder engine 102 (i.e., "Window 1," "Window 2," and "Window 3"). This may indicate that the user 108 has closed "Window 4" or has completed the action begun in the "Teams" application that caused the row for "Window 4" to be added to the window status table 142 (as shown in FIG. 6A). As shown in FIG. 6B, in the row of entries for "Window 1," the "inactive window flag" entry 156 may now be set to "false," and the "inactive window timestamp" entry 154 may now lack a timestamp. This may indicate that the user 108 has swapped focus back to "Window 1" for the "Internet Explorer" application.

Figure 7:
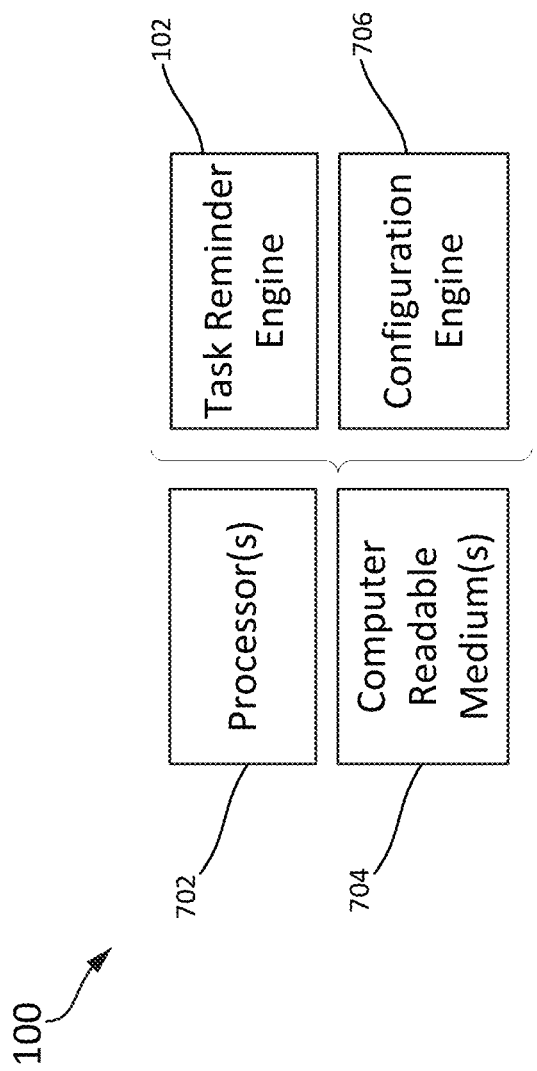
FIG. 7 shows an example implementation of certain components of the system shown in FIG. 1A.

As shown in FIG. 7, in some implementations, the system 100 may include one or more processors 702 and one or more computer readable mediums 704 that may be encoded with instructions which, when executed by the processor(s) 702 may implement the functionality of the task reminder engine 102 (described above) as well as a configuration engine 706 (described below). As explained in more detail below, in some implementations, the configuration engine 706 may be used to set and/or update the entries in the application configuration table 128, e.g., based on input provided by a system administrator or application developer.

In some implementations, the task reminder engine 102 may be configured for any of a number of application types, including native applications, Software as a service (SaaS) applications, Virtual Desktop Access (VDA) applications, web browsers, etc. Example applications may include, but are not limited to Outlook, Word, Salesforce, Workday, Notepad, Internet Explorer, Slack, Teams, etc.

Figure 8:
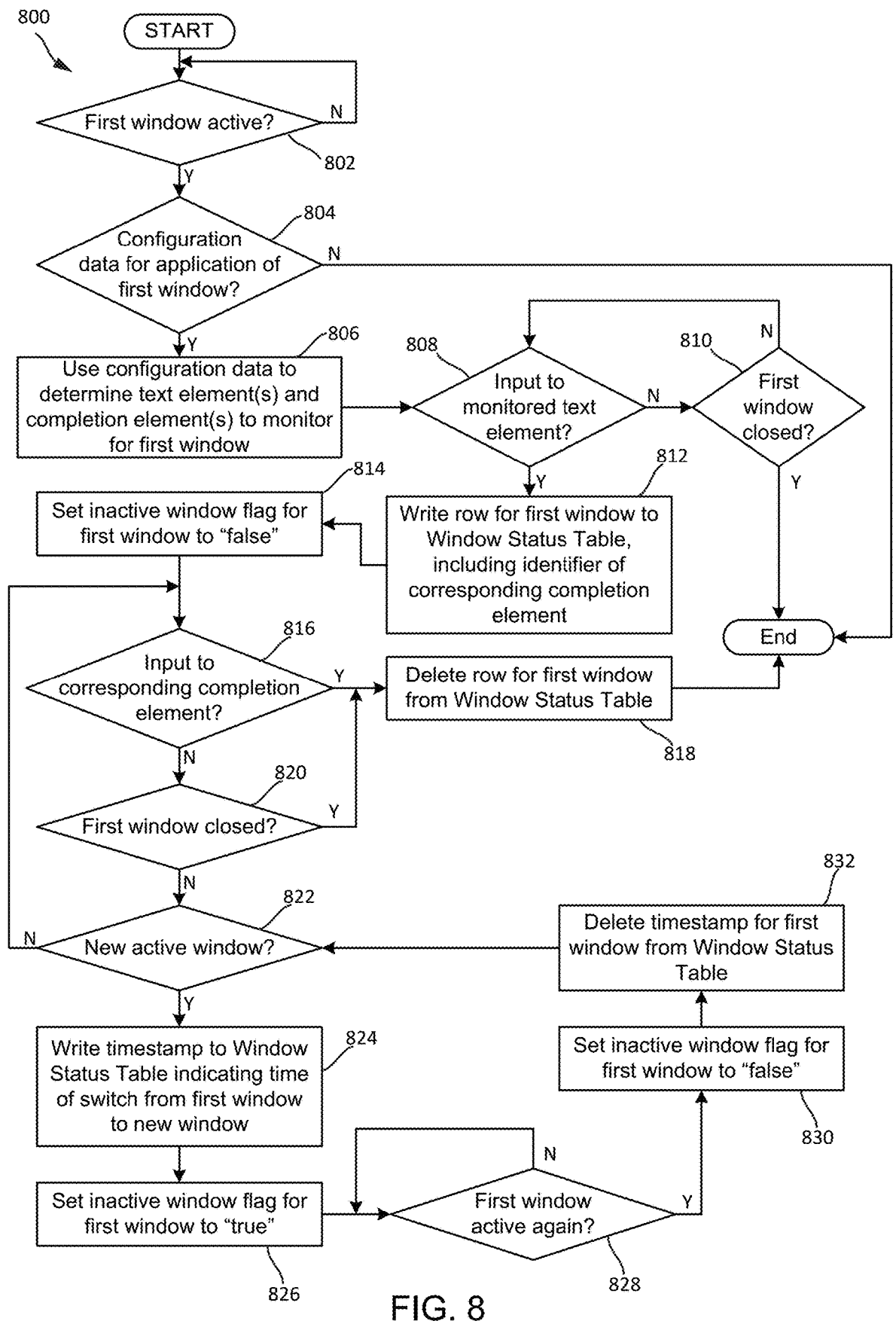
FIG. 8 shows a first example routine that may be executed by the task reminder engine shown in FIG. 7 to write and/or update entries in the window status table shown in FIG. 1B in accordance with some embodiments.
Figure 9:
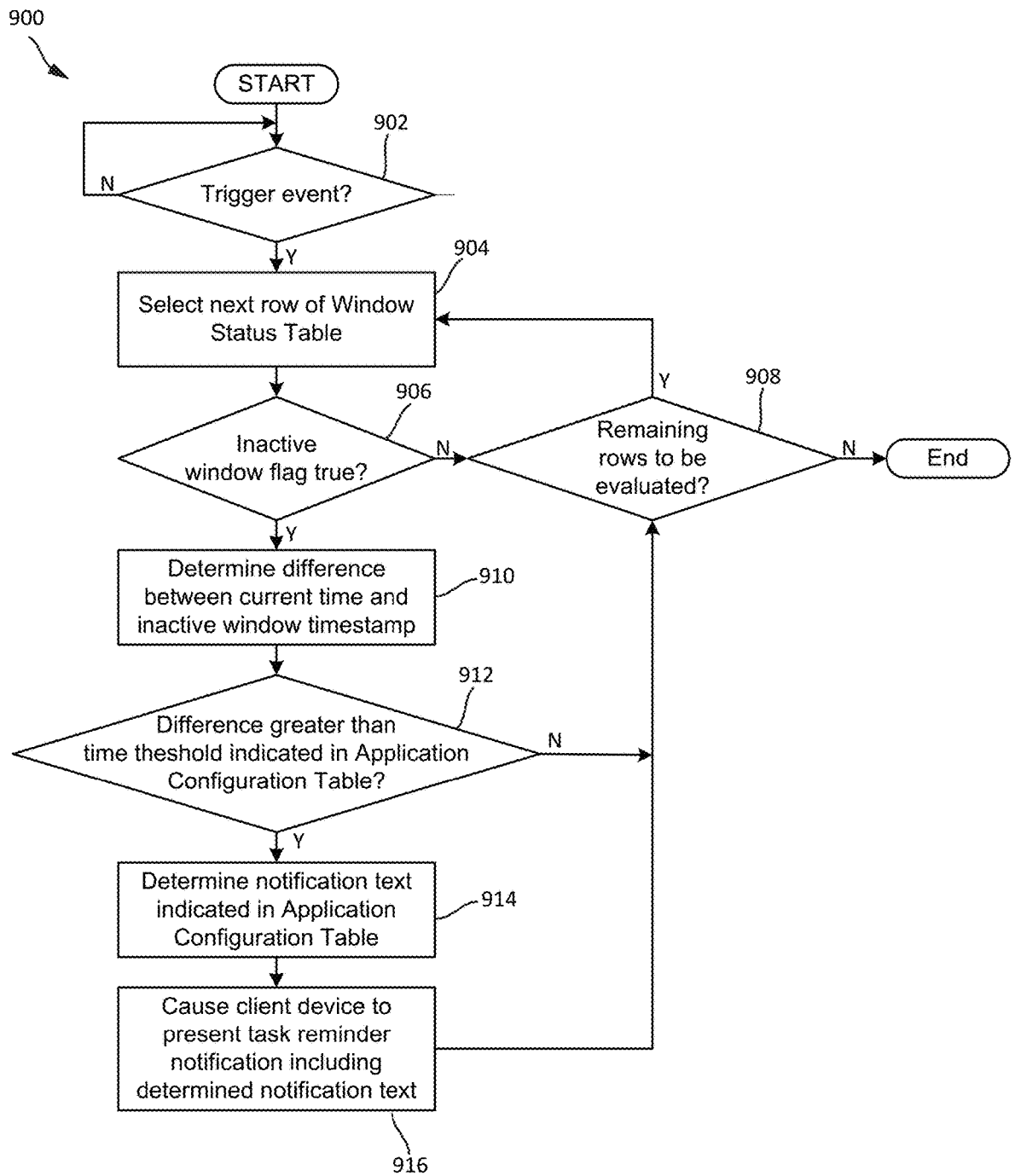
FIG. 9 shows a second example routine that may be executed by the task reminder engine shown in FIG. 7 to determine when and how to cause a client device to present task reminder notifications based on the current contents of the window status table shown in FIG. 1B in accordance with some embodiments.

FIGS. 8 and 9 show, respectively, a first example routine 800 and a second example routine 900 that may be performed by the task reminder engine 102. As explained in more detail below, the first routine 800 may be responsible for updating and maintaining the entries in the window status table 142 based on a user's interactions with text field elements and completion elements in various windows. FIG. 9, on the other hand, may be responsible for determining when and how to cause the client device 106 to present task reminder notifications 180 based on the current contents of the window status table 142.

As shown in FIG. 8, the routine 800 may begin at a decision step 802 when the task reminder engine 102 determines that a first window (e.g., the first window 168 shown in FIG. 1C) is active. The task reminder engine 102 may determine whether the first window 168 is active, for example, by determining the first window 168 has focus from the operating system 118.

At a decision step 804, the task reminder engine 102 may determine whether the application configuration table 128 contains configuration data for the application (e.g., "User App A") presented in the first window 168. The task reminder engine may, for example, determine whether one or more of the "application ID" entries 132 in the application configuration table 128 identify the application being presented in the first window 168.

When, at the decision step 804, the task reminder engine 102 determines the application configuration table 128 does not include configuration data for the application presented in the first window 168, the routine 800 may terminate. When, on the other hand, the task reminder engine 102 determines (at the decision step 804) that the application configuration table 128 does include configuration data for the application presented in the first window 168, the routine 800 may proceed to a step 806, at which the task reminder engine 102 may use the configuration data for that application to determine text field element(s) 170 and completion element(s) 172 in the first window 168 that are to be monitored for user input (e.g., using event handlers, as described above). The to-be-monitored text field element(s) 170 may be identified, for example, based on the "text element type" entries 134 that are associated with the application (e.g., per the "application ID" entries 132) in the application configuration table 128. Similarly, the to-be monitored completion element(s) 172 may be identified, for example, based on the "completion element type" entries 136 that are associated with the application (e.g., per the "application ID" entries 132) in the application configuration table 128.

Per decision steps 808 and 810, the task reminder engine 102 may continuously monitor whether the user 108 has provided an input to a monitored text field element 170 until either such an input has been provided (per the decision step 808) or the first window 168 has been closed (per the decision step 810). When the task reminder engine 102 determines (per the decision step 810) that the first window 168 has been closed, the routine 800 may terminate. The task reminder engine 102 may determine whether the first window 168 has been closed, for example, using one or more event handlers or based on other communications with the operating system 118. When, at the decision step 808, the task reminder engine 102 determines that the user 108 has provided an input to the monitored text field element 170, the routine 800 may proceed to a step 812, at which the task reminder engine 102 may write a row to the window status table 142 corresponding to the first window 168. As noted above, such a row may include an "application ID" entry 146 identifying the application presented in the first window 168, a "window ID" entry 148 identifying the first window 168, a "text element ID" entry 150 identifying a text field element 170 determined at the step 806, and a "completion element ID" entry 152 identifying a completion element 172 determined at the step 806.

At a step 814 of the routine 800, the task reminder engine 102 may set the "inactive window flag" 156 entry for the row for the first window 168 in the window status table 142 to "false," thus indicating that the first window 168 is currently the active window of the operating system 118.

Per decision steps 816, 820, and 822, the task reminder engine 102 may continuously monitor whether (A) the user 108 has provided an input to the completion element 172 in the newly-written row, (B) the first window 168 has been closed, or (C) the user 108 has operated the client device 106 to switch to a new window (e.g., the second window 176 shown in FIG. 1D). Techniques for monitoring for such events are described above.

When, at the decision step 816, the task reminder engine 102 determines that the user has provided an input to the indicated completion element 172, the routine 800 may proceed to a step 818, at which the row for the first window 168 (which was written at the step 812) may be deleted from the window status table 142. Similarly, when, at the decision step 820, the task reminder engine 102 determines that the first window 168 has been closed, the routine 800 may proceed to the step 818, at which the row for the first window 168 (which was written at the step 812) may likewise be deleted from the window status table 142.

When, at the decision step 822, the task reminder engine 102 determines that the user 108 has operated the client device 106 to switch to a second window (e.g., the second window 176 shown in FIG. 1D), the routine 800 may proceed to a step 824 at which the task reminder engine 102 may determine a timestamp corresponding to the time at which the switch to the new window occurred, and may write that timestamp as an "inactive window timestamp" entry 154 to the row for the first window 168 in the window status table 142.

At a step 826 of the routine 800, the task reminder engine 102 may set the "inactive window flag" entry 156 for the row for the first window 168 in the window status table 142 to "true."

Per a decision step 828, the routine 800 may wait until the task reminder engine 102 determines that the first window 168 has again become the active window for the operating system 118. When, at the decision step 828, the task reminder engine 102 determines that the first window 168 has again become the active window, the routine 800 may proceed to a step 830, at which the task reminder engine 102 may set the "inactive window flag" entry 156 for the row for the first window 168 in the window status table 142 to "false," thus ensuring that the task reminder engine 102 will not cause the client device 106 to present a task reminder notification 180 when the first window 168 to which the task relates is the active window for the operating system 118.

At the step 832 of the routine 800, the task reminder engine 102 may delete the timestamp written to the row for the first window 168 in the window status table 142 (per the step 824), following the step 832, the routine 800 may return to the decision steps 816, 820, and 822 to again perform the operations described above.

As noted above, FIG. 9 shows an example routine 900 that may be performed by the task reminder engine 102 to determine when and how to cause the client device 106 to present task reminder notifications 180 based on the current contents of the window status table 142. As shown in FIG. 9, the routine 900 may begin at a decision step 902 when the task reminder engine 102 determines that a trigger event has occurred. The trigger event detected at the decision step 902 may take on any of numerous forms. In some implementations, for example, the trigger event may correspond to the passage of a particular period of time (e.g., ten seconds, thirty seconds, etc.) since the last time the routine 900 was executed, such that the task reminder engine 102 performs the routine 900 periodically. In other implementations, a triggering event may additionally or alternatively correspond to an event detected by task reminder engine 102, e.g., using one or more event handlers or based on other communications with the operating system 118. For instance, in some implementations, the task reminder engine 102 may additionally or alternatively perform the routine 900 in response to detecting that the operating system 118 has given focus to a new window or a new element within an open window.

Per the step 904 and the decision step 908, the task reminder engine 102 may select individual rows of the window status table 142 for evaluation to determine whether circumstances indicate that a task reminder notification 180 is to be presented on the client device 106 based on the current contents of that row. Although the routine 900 indicates that the rows are evaluated one at a time, it should be appreciated that in some implementations the evaluation of some or all of the rows, as described below, may alternately proceed in parallel.

At a decision step 906 of the routine 900, the task reminder engine 102 may determine whether the "inactive window flag" entry 156 for the current row is set to "true." When, at the decision step 906, the task reminder engine 102 determines that the "inactive window flag" entry 156 is not set to true, the routine 900 may proceed to the decision step 908, at which the task reminder engine 102 may determine whether there are any remaining rows of the window status table 142 to be evaluated. Accordingly, in such implementations, the task reminder engine 102 will refrain from causing the client device 106 to present a task reminder notification 180 for the row under consideration if the "inactive window flag" entry 156 for that row is set to "false."

At a step 910 of the routine 900, the task reminder engine 102 may determine a difference between a current time (e.g., determined based on a clock of the operating system 118) and the "inactive window timestamp" entry 154 for the row under consideration.

At a decision step 912, the task reminder engine 102 may determine whether the time difference determined at the step 910 exceeds a particular time threshold. The time threshold value used for such a comparison may be determined, for example, by referencing the "time threshold" entry 140 in the application configuration table 128 for the application indicated by the "application ID" entry 146 of the row of the window status table 142 that is being evaluated. As noted above, in some implementations, such time thresholds may be customized for different applications (identified by the "application ID" entries 132 in the application configuration table 128), so as to allow different amounts of time to elapse before presenting task reminder notifications 180 for different applications.

When, at the decision step 912, the task reminder engine 102 determines that the time difference determined at the step 910 and the "inactive window timestamp" entry 154 does not exceed the pertinent time threshold, the routine 900 may proceed to the decision step 908, at which the task reminder engine 102 may again determine whether there are any remaining rows in the application configuration table 128 to be evaluated. Accordingly, in such implementations, the task reminder engine 102 will also refrain from causing the client device 106 to present a task reminder notification 180 for the row under consideration if the time difference determined at the step 910 does not exceed the applicable threshold (e.g., as determined from a corresponding "time threshold" entry 140 in the application configuration table 128).

At a step 914 of the routine 900, the task reminder engine 102 may determine appropriate text for a task reminder notification 180 to be presented on the client device 106. In some implementations, such text may be determined by referencing the "notification text" entry 138 in the application configuration table 128 for the application indicated by the "application ID" entry 146 of the row of the window status table 142 that is being evaluated. As noted above, in some implementations, such text may be customized for different applications (identified by the "application ID" entries 132 in the application configuration table 128), so that the task reminder notifications 180 may more clearly indicate the nature of the incomplete tasks at issue.

At a step 916 of the routine 900, the task reminder engine 102 may cause the client device 106 to present a task reminder notification 180 for the row of the widow status table 142 being evaluated. As indicated, in some implementations, the task reminder engine 102 may cause the task reminder notification 180 to include the notification text determined at the step 914. The task reminder engine 102 may then return to the decision step 908, at which the task reminder engine 102 may again determine whether there are any remaining rows in the application configuration table 128 to be evaluated.

After evaluating the entirety of the window status table 142 (e.g., when the task reminder engine 102 determines that there are no remaining rows to be evaluated), the routine 900 may terminate, until another applicable trigger event is detected (per the decision step 902).

Figure 10:
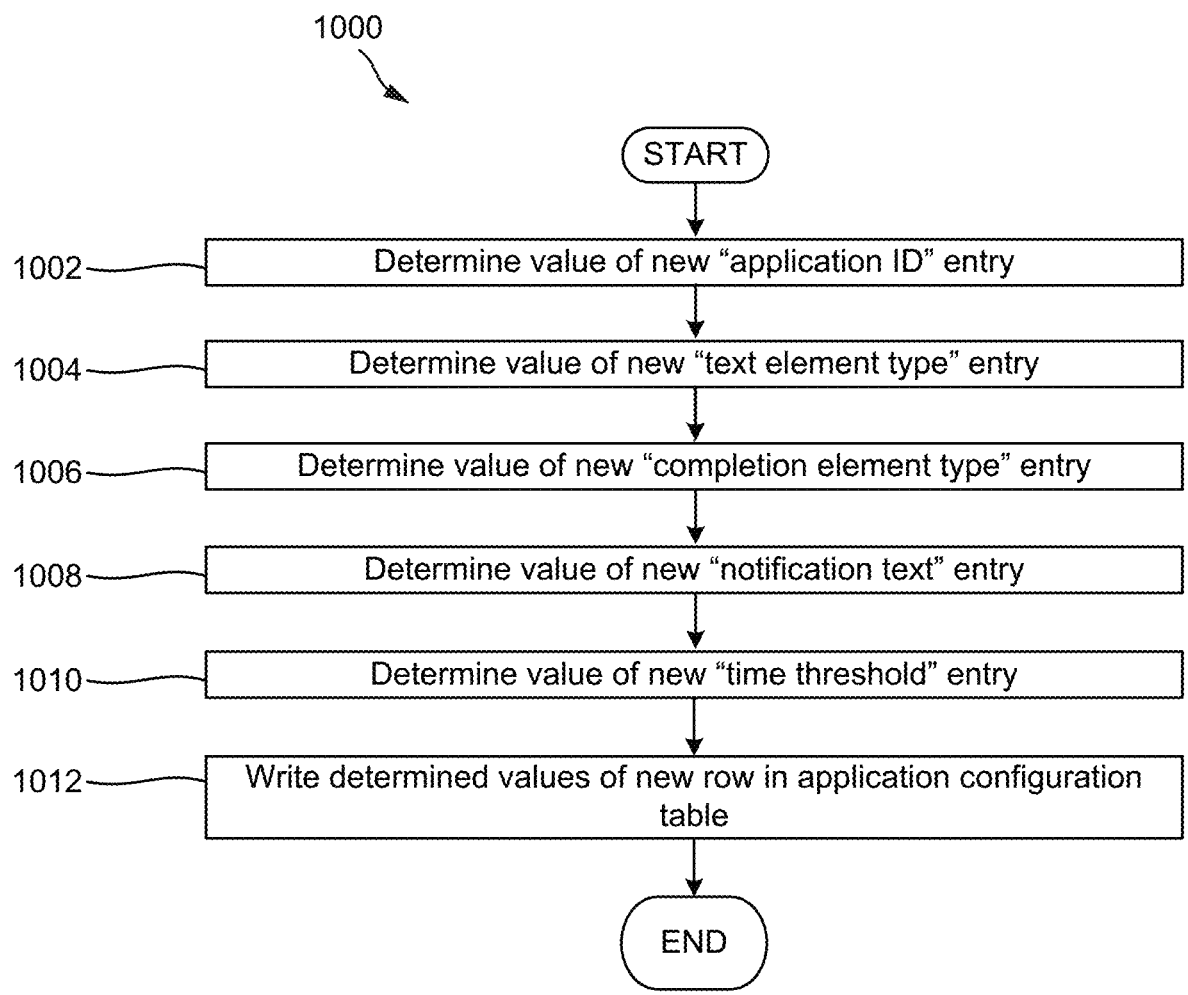
FIG. 10 shows an example routine that may be executed by the configuration engine shown in FIG. 7 in accordance with some embodiments.

FIG. 10 shows an example routine 1000 that may be performed by the configuration engine 706 (shown in FIG. 7. As explained in more detail below, the example routine 1000 may be responsible for adding entries to the application configuration table 128, e.g., in response to input by a system administrator, application developer, etc. For example, in some implementations, for individual steps 1002-1010 of the routine 1000, the configuration engine 706 may receive an input from the system administrator, application developer, etc., in response to the configuration engine 706 presenting prompts for such inputs. For example, in some implementations, the configuration engine 706 may enable a system administrator to launch a "notification configuration wizard" or the like, that steps the system administrator through the process of specifying values to add to the application configuration table 128, thus allowing the system administrator to customize how the task reminder engine 102 is to function with respect to different applications. In some implementations, such notification configuration functionality may additionally or alternatively be invoked by the user 108 of the client device 106, so as to enable the user 108 to control the circumstances in which task reminder notifications 180 are to be presented for different applications. In some implementations, the configuration engine 706 may additionally or alternatively present the user 108 with one or more options for disabling the generation of task reminder notifications 180 for one or more particular applications, or even altogether, based on that user's preferences. Accordingly, in some implementations, different application configuration tables 128 may be configured for respective users, so as to enable the presentation of task reminder notifications 180 to be customized on a user-by-user basis.

As shown in FIG. 10, the routine 1000 may begin at a step 1002, at which the configuration engine 706 may determine a value of a new "application ID" entry 132, e.g., as specified by the system administrator, application developer, the user 108, or otherwise, as described above.

At a step 1004 of the routine 1000, the configuration engine 706 may determine a value of a new "text element type" entry 134, e.g., as specified by the system administrator, application developer, the user 108, or otherwise, as described above.

At a step 1006 of the routine 1000, the configuration engine 706 may determine a value of a new "completion element type" entry 136, e.g., as specified by the system administrator, application developer, the user 108, or otherwise, as described above.

At a step 1008 of the routine 1000, the configuration engine 706 may determine a value of a new "notification text" entry 138, e.g., as specified by the system administrator, application developer, the user 108, or otherwise, as described above.

At a step 1010 of the routine 1000, the configuration engine 706 may determine a value of a new "time threshold" entry 140, e.g., as specified by the system administrator, application developer, the user 108, or otherwise, as described above.

Finally, at a step 1012 of the routine 1000, the configuration engine 706 may write the values determined at the steps 1002, 1004, 1006, 1008, and 1010, as a new row to the application configuration table 128. As noted above, in some implementations, such newly-added row may be indexed by a unique "entry ID" entry 130, so as to differentiate it from the other rows of the application configuration table 128.

F. Example Implementations of Methods, Systems, and Computer-Readable Media in Accordance with the Present Disclosure The following paragraphs (M1) through (M7) describe examples of methods that may be implemented in accordance with the present disclosure.

(M1) A method may be performed that involves determining that a user has provided a first input to a client device to begin taking an action with respect to an application presented in a first window of an operating system while the first window is an active window of the operating system;

determining, after the user provided the first input, that a second window has become the active window of the operating system; determining that the user has not provided a second input to the client device to complete the action with respect to the application; and causing, based at least in part on the second window having become the active window and the user not having provided the second input, the client device to present a notification indicative of the action being incomplete.

(M2) A method may be performed as described in paragraph (M1), and may further involve determining an amount of time that elapsed after the second window became the active window, wherein causing the client device to present the notification may be further based at least in part on the amount of time exceeding a threshold time.

(M3) A method may be performed as described in paragraph (M1) or paragraph (M2), wherein determining that the user provided the first input may involve determining that the user entered text into a text box presented in the first window; and determining that the user has not provided the second input may involve determining that the user has not selected a completion button presented in the first window.

(M4) A method may be performed as described in paragraph (M3), wherein the completion button may comprise a submit button, an enter button, or a send button.

(M5) A method may be performed as described in any of paragraphs (M1) through (M4), wherein causing the client device to present the notification may involve causing the client device to present the notification in association with an application icon in an application taskbar displayed on the client device.

(M6) A method may be performed as described in any of paragraphs (M1) through (M5), and may further involve determining that first text is stored in association with an identifier of the application; and configuring, based at least in part the application being presented in the first window, the notification to include the first text.

(M7) A method may be performed as described in any of paragraphs (M1) through (M6), wherein determining that the second window has become the active window may involve determining that the operating system has given focus to the second window rather than the first window.

The following paragraphs (S1) through (S7) describe examples of systems and devices that may be implemented in accordance with the present disclosure.

(S1) A system may include at least one processor, and at least one computer-readable medium encoded with instructions which, when executed by the at least one processor, cause the system to determine that a user has provided a first input to a client device to begin taking an action with respect to an application presented in a first window of an operating system while the first window is an active window of the operating system, to determine, after the user provided the first input, that a second window has become the active window of the operating system, to determine that the user has not provided a second input to the client device to complete the action with respect to the application, and to cause, based at least in part on the second window having become the active window and the user not having provided the second input, the client device to present a notification indicative of the action being incomplete.

(S2) A system may be configured as described in paragraph (S1), wherein the at least one computer-readable medium may be further encoded with additional instructions which, when executed by the at least one processor, further cause the system to determine an amount of time that elapsed after the second window became the active window, and to cause the client device to present the notification may further based at least in part on the amount of time exceeding a threshold time.

(S3) A system may be configured as described in paragraph (S1) or paragraph (S2), wherein the at least one computer-readable medium may be further encoded with additional instructions which, when executed by the at least one processor, further cause the system to determine that the user provided the first input at least in part by determining that the user entered text into a text box presented in the first window, and to determine that the user has not provided the second input at least in part by determining that the user has not selected a completion button presented in the first window.

(S4) A system may be configured as described in paragraph (S3), wherein the completion button may comprise a submit button, an enter button, or a send button.

(S5) A system may be configured as described in any of paragraphs (S1) through (S4), wherein the at least one computer-readable medium may be further encoded with additional instructions which, when executed by the at least one processor, further cause the system to cause the client device to present the notification at least in part by causing the client device to present the notification in association with an application icon in an application taskbar displayed on the client device.

(S6) A system may be configured as described in any of paragraphs (S1) through (S5), wherein the at least one computer-readable medium may be further encoded with additional instructions which, when executed by the at least one processor, further cause the system to determine that first text is stored in association with an identifier of the application, and to configure, based at least in part the application being presented in the first window, the notification to include the first text.

(S7) A system may be configured as described in any of paragraphs (S1) through (S6), wherein the at least one computer-readable medium may be further encoded with additional instructions which, when executed by the at least one processor, further cause the system to determine that the second window has become the active window at least in part by determining that the operating system has given focus to the second window rather than the first window.

The following paragraphs (CRM1) through (CRM7) describe examples of computer-readable media that may be implemented in accordance with the present disclosure.

(CRM1) At least one non-transitory computer-readable medium may be encoded with instructions which, when executed by the at least one processor of a system, cause the system to determine that a user has provided a first input to a client device to begin taking an action with respect to an application presented in a first window of an operating system while the first window is an active window of the operating system, to determine, after the user provided the first input, that a second window has become the active window of the operating system, to determine that the user has not provided a second input to the client device to complete the action with respect to the application, and to cause, based at least in part on the second window having become the active window and the user not having provided the second input, the client device to present a notification indicative of the action being incomplete.

(S2) At least one non-transitory computer-readable medium may be configured as described in paragraph (S1), and may be further encoded with additional instructions which, when executed by the at least one processor, further cause the system to determine an amount of time that elapsed after the second window became the active window, and to cause the client device to present the notification may further based at least in part on the amount of time exceeding a threshold time.

(S3) At least one non-transitory computer-readable medium may be configured as described in paragraph (S1) or paragraph (S2), and may be further encoded with additional instructions which, when executed by the at least one processor, further cause the system to determine that the user provided the first input at least in part by determining that the user entered text into a text box presented in the first window, and to determine that the user has not provided the second input at least in part by determining that the user has not selected a completion button presented in the first window.

(S4) At least one non-transitory computer-readable medium may be configured as described in paragraph (S3), wherein the completion button may comprise a submit button, an enter button, or a send button.

(S5) At least one non-transitory computer-readable medium may be configured as described in any of paragraphs (S1) through (S4), and may be further encoded with additional instructions which, when executed by the at least one processor, further cause the system to cause the client device to present the notification at least in part by causing the client device to present the notification in association with an application icon in an application taskbar displayed on the client device.

(S6) At least one non-transitory computer-readable medium may be configured as described in any of paragraphs (S1) through (S5), and may be further encoded with additional instructions which, when executed by the at least one processor, further cause the system to determine that first text is stored in association with an identifier of the application, and to configure, based at least in part the application being presented in the first window, the notification to include the first text.

(S7) At least one non-transitory computer-readable medium may be configured as described in any of paragraphs (S1) through (S6), and may be further encoded with additional instructions which, when executed by the at least one processor, further cause the system to determine that the second window has become the active window at least in part by determining that the operating system has given focus to the second window rather than the first window.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining first data that associates a first threshold amount of time with a first application;
   determining second data that associates a second threshold amount of time, which is different than the first threshold amount of time, with a second application; and
   after determining the first data and the second data:
      determining that a user has provided a first input to a client device to begin taking a first action with respect to the first application presented in a first window of an operating system while the first window is an active window of the operating system;
      determining, after the user provided the first input, that a second window has become the active window of the operating system;
      determining that the user has not provided a second input to the client device to complete the first action with respect to the first application;
      causing, based at least in part on the second window having become the active window, the user not having provided the second input, and the first threshold amount of time having elapsed since the second window became the active window, the client device to present a first notification indicative of the first action being incomplete;
      determining that the user has provided a third input to the client device to begin taking a second action with respect to the second application presented in a third window of the operating system while the third window is the active window of the operating system, the second application being different than the first application;
      determining, after the user provided the third input, that a fourth window has become the active window of the operating system;
      determining that the user has not provided a fourth input to the client device to complete the second action with respect to the second application; and
      causing, based at least in part on the fourth window having become the active window, the user not having provided the fourth input, and the second threshold amount of time having elapsed since the fourth window became the active window, the client device to present a second notification indicative of the second action being incomplete.

2. The method of claim 1, wherein causing the client device to present the first notification further comprises:
    causing the client device to present the first notification in association with an application icon in an application taskbar displayed on the client device, wherein the application icon is associated with the first application.

3. The method of claim 1, further comprising:
determining third data associating first text with the first application; and
configuring, based at least in part the first application being presented in the first window, the first notification to include the first text.

4. The method of claim 1, wherein determining that the second window has become the active window comprises:
    determining that the operating system has given focus to the second window rather than the first window.

5. The method of claim 1, wherein:
determining that the user provided the first input further comprises determining that the user entered text into a text box presented in the first window; and
determining that the user has not provided the second input further comprises determining that the user has not selected a completion button presented in the first window.

6. The method of claim 5, wherein the completion button comprises a submit button, an enter button, or a send button.

7. A system comprising:
at least one processor; and
at least one computer-readable medium encoded with instructions which, when executed by the at least one processor, cause the system to:
    determine first data that associates a first threshold amount of time with a first application;
    determine second data that associates a second threshold amount of time, which is different than the first threshold amount of time, with a second application; and
    after determining the first data and the second data:
        determine that a user has provided a first input to a client device to begin taking a first action with respect to the first application presented in a first window of an operating system while the first window is an active window of the operating system;
        determine, after the user provided the first input, that a second window has become the active window of the operating system;
        determine that the user has not provided a second input to the client device to complete the first action with respect to the first application;
        cause, based at least in part on the second window having become the active window, the user not having provided the second input, and the first threshold amount of time having elapsed since the second window became the active window, the client device to present a first notification indicative of the first action being incomplete;
        determine that the user has provided a third input to the client device to begin taking a second action with respect to the second application presented in a third window of the operating system while the third window is the active window of the operating system, the second application being different than the first application;
        determine, after the user provided the third input, that a fourth window has become the active window of the operating system;
        determine that the user has not provided a fourth input to the client device to complete the second action with respect to the second application; and
        cause, based at least in part on the fourth window having become the active window, the user not having provided the fourth input, and the second threshold amount of time having elapsed since the fourth window became the active window, the client device to present a second notification indicative of the second action being incomplete.

8. The system of claim 7, wherein the at least one computer-readable medium is further encoded with additional instructions which, when executed by the at least one processor, further cause the system to:
    cause the client device to present the first notification in association with an application icon in an application taskbar displayed on the client device, wherein the application icon is associated with the first application.

9. The system of claim 7, wherein the at least one computer-readable medium is further encoded with additional instructions which, when executed by the at least one processor, further cause the system to:
    determine third data associating first text with the first application; and
    configure, based at least in part the first application being presented in the first window, the first notification to include the first text.

10. The system of claim 7, wherein the at least one computer-readable medium is further encoded with additional instructions which, when executed by the at least one processor, further cause the system to:
    determine that the second window has become the active window at least in part by determining that the operating system has given focus to the second window rather than the first window.

11. The system of claim 7, wherein the at least one computer-readable medium is further encoded with additional instructions which, when executed by the at least one processor, further cause the system to:
    determine that the user provided the first input at least in part by determining that the user entered text into a text box presented in the first window; and
    determine that the user has not provided the second input at least in part by determining that the user has not selected a completion button presented in the first window.

12. The system of claim 11, wherein the completion button comprises a submit button, an enter button, or a send button.

13. At least one non-transitory computer-readable medium encoded with instructions which, when executed by at least one processor of a system, cause the system to:
    determine first data that associates a first threshold amount of time with a first application;
    determine second data that associates a second threshold amount of time, which is different than the first threshold amount of time, with a second application; and
    after determining the first data and the second data:
        determine that a user has provided a first input to a client device to begin taking a first action with respect to the first application presented in a first window of an operating system while the first window is an active window of the operating system;
        determine, after the user provided the first input, that a second window has become the active window of the operating system;

determine that the user has not provided a second input to the client device to complete the first action with respect to the first application;

cause, based at least in part on the second window having become the active window, the user not having provided the second input, and the first threshold amount of time having elapsed since the second window became the active window, the client device to present a first notification indicative of the first action being incomplete;

determine that the user has provided a third input to the client device to begin taking a second action with respect to the second application presented in a third window of the operating system while the third window is the active window of the operating system, the second application being different than the first application;

determine, after the user provided the third input, that a fourth window has become the active window of the operating system;

determine that the user has not provided a fourth input to the client device to complete the second action with respect to the second application; and cause, based at least in part on the fourth window having become the active window, the user not having provided the fourth input, and the second threshold amount of time having elapsed since the fourth window became the active window, the client device to present a second notification indicative of the second action being incomplete.

14. The at least one non-transitory computer-readable medium of claim 13, further encoded with additional instructions which, when executed by the at least one processor, further cause the system to:

determine that the user provided the first input at least in part by determining that the user entered text into a text box presented in the first window; and determine that the user has not provided the second input at least in part by determining that the user has not selected a completion button presented in the first window.

15. The at least one non-transitory computer-readable medium of claim 13, further encoded with additional instructions which, when executed by the at least one processor, further cause the system to:

cause the client device to present the first notification in association with an application icon in an application taskbar displayed on the client device, wherein the application icon is associated with the first application.

16. The at least one non-transitory computer-readable medium of claim 13, further encoded with additional instructions which, when executed by the at least one processor, further cause the system to:

determine third data associating first text with the first application; and configure, based at least in part the first application being presented in the first window, the first notification to include the first text.

17. The at least one non-transitory computer-readable medium of claim 13, further encoded with additional instructions which, when executed by the at least one processor, further cause the system to:

determine that the second window has become the active window at least in part by determining that the operating system has given focus to the second window rather than the first window.

* * * * *